(12) United States Patent
Yoon et al.

(10) Patent No.: US 10,194,182 B2
(45) Date of Patent: Jan. 29, 2019

(54) SIGNAL TRANSMISSION AND RECEPTION APPARATUS AND SIGNAL TRANSMISSION AND RECEPTION METHOD FOR PROVIDING TRICK PLAY SERVICE

(71) Applicant: LG ELECTRONICS INC., Seoul (KR)

(72) Inventors: Joonhee Yoon, Seoul (KR); Soojin Hwang, Seoul (KR); Jongyeul Suh, Seoul (KR); Sunghyun Cho, Seoul (KR); Sangheon Lee, Seoul (KR); Youngwook Kang, Seoul (KR); Hyunmook Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/105,318

(22) PCT Filed: Feb. 2, 2015

(86) PCT No.: PCT/KR2015/001068
§ 371 (c)(1),
(2) Date: Jun. 16, 2016

(87) PCT Pub. No.: WO2015/115869
PCT Pub. Date: Aug. 6, 2015

(65) Prior Publication Data
US 2016/0323609 A1    Nov. 3, 2016

Related U.S. Application Data

(60) Provisional application No. 61/935,293, filed on Feb. 3, 2014, provisional application No. 61/954,615, filed on (Continued)

(51) Int. Cl.
*H04N 21/2387* (2011.01)
*H04N 21/854* (2011.01)
(Continued)

(52) U.S. Cl.
CPC ..... *H04N 21/2387* (2013.01); *H04N 21/4147* (2013.01); *H04N 21/6379* (2013.01); *H04N 21/85406* (2013.01)

(58) Field of Classification Search
CPC ......... H04N 21/2387; H04N 21/85406; H04N 21/4147; H04N 21/6379
See application file for complete search history.

(56) References Cited

U.S. PATENT DOCUMENTS

2009/0323822 A1  12/2009  Rodriguez et al.
2013/0176387 A1   7/2013  Suh et al.
(Continued)

FOREIGN PATENT DOCUMENTS

CN       103168473 A    6/2013
KR   10-2013-0098184 A  9/2013
(Continued)

OTHER PUBLICATIONS

ETSI, "Digital Video Broadcasting (DVB); Specification for the Use of Video and Audio Coding in Broadcasting Applications based on the MPEG-2 Transport Stream," ETSI TS 101 154, V1.11.1, Nov. 2012, pp. 1-2, 157-167.

*Primary Examiner* — Yassin Alata
(74) *Attorney, Agent, or Firm* — Birch, Stewart, Kolasch & Birch, LLP

(57) ABSTRACT

The present invention relates to a signal transmission and reception apparatus and a signal transmission and reception method. An embodiment of the present invention provides a signal transmission method comprising: a step (S110) of encoding video data; a step (S120) of encoding a file format including the encoded video data, wherein the file format includes pre-filtering information for trick play; and a step (S130) of transmitting data including the encoded file format. According to an embodiment of the present invention, it is possible to provide trick play for an encoded stream more efficiently.

5 Claims, 32 Drawing Sheets

Related U.S. Application Data on Mar. 18, 2014, provisional application No. 61/970,910, filed on Mar. 27, 2014.

(51) Int. Cl.
*H04N 21/4147* (2011.01)
*H04N 21/6379* (2011.01)

(56) References Cited

U.S. PATENT DOCUMENTS

| | | |
|---|---|---|
| 2013/0209063 A1 | 8/2013 | Suh et al. |
| 2014/0003491 A1 | 1/2014 | Chen et al. |
| 2014/0016694 A1* | 1/2014 | Boyce .................. H04N 19/70 375/240.02 |
| 2015/0063467 A1 | 3/2015 | Hendry et al. |
| 2015/0063790 A1* | 3/2015 | Rodriguez ........... G11B 27/005 386/351 |
| 2015/0085938 A1 | 3/2015 | Hendry et al. |

FOREIGN PATENT DOCUMENTS

| | | |
|---|---|---|
| KR | 10-2013-0129080 A | 11/2013 |
| WO | WO 2012/050405 A2 | 4/2012 |
| WO | WO 2013/100641 A1 | 7/2013 |
| WO | WO 2013/137697 A1 | 9/2013 |
| WO | WO 2013/187698 A1 | 12/2013 |

* cited by examiner

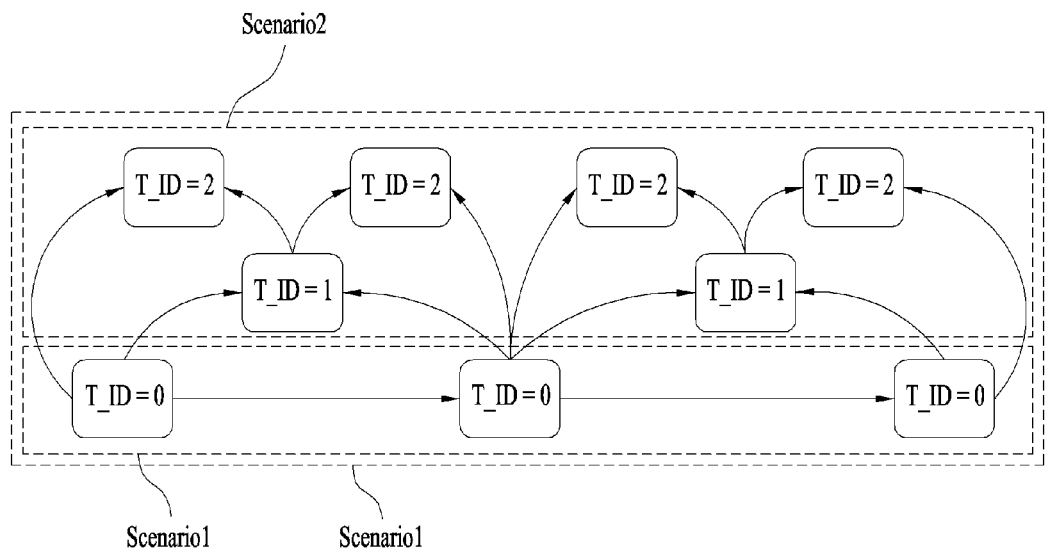

FIG. 3

```
Syntax
aligned(8) class HEVCNALBox
              extends Box('hvcn')
{
              HEVCDecoderConfigurationRecord()HEVCConfig;
}
```

FIG. 4

| Element | Definition | Value | Card |
|---|---|---|---|
| HighDynamicRange | | xs:string | 0..1 |

FIG. 5

| | | | |
|---|---|---|---|
| Random access point pictures | IDR | Instantaneous decoding refresh | Without associated leading picture |
| | | | May have associated leading picture |
| | BLA | Broken link access | Without associated leading picture |
| | | | May have associated RADL pictures but without associated RASL pictures |
| | | | May have associated RADL and RASL |
| | CRA | Clean random access | |
| Leading picture | RADL | Random access decodable leading picture | |
| | RASL | Random access skipped leading picture | Not-used for reference in the same sub-layer |
| Temporal sub-layer access pictures | TSA | Temporal sub-layer access | May be used for reference in the same sub-layer |
| | | | Not-used for reference in the same sub-layer |
| | STSA | Step-wise temporal sub-layer access | May be used for reference in the same sub-layer |
| | | | Not-used for reference in the same sub-layer |
| Non-constrained | | | May be used for reference in the same sub-layer |
| | | | Not-used for reference in the same sub-layer | dependency_level

| 1 | 5 | 4 | 5 | 3 | 5 | 4 | 5 | 2 | 5 | 4 | 5 | 3 | 5 | 4 | 5 | 2 | 5 | 4 | 5 | 3 | 5 | 4 | 5 | 1 |

X2 speed(dependency_level: 1~4)

| x | | x | | x | | x | | x | | x | | x | | x | | x | | x | | x | | x | | x |

X4 speed(dependency_level: 1~3)

| x | | | | x | | | | x | | | | x | | | | x | | | | x | | | | x |

X8 speed(dependency_level: 1~2)

| x | | | | | | | | x | | | | | | | | x | | | | | | | | x |

X16 speed(dependency_level: 1)

| x | | | | | | | | | | | | | | | | | | | | | | | | x |

FIG. 10

```
aligned(8) class TrickPlayBox
            extends Fullbox('trikhvc', version=0, flags=0)
{
            for (i=0; I<sample_count, i++){
                        unsigned int(4) pic_type;
                        unsigned int(6) dependency_level;
                        unsigned int(6) reserved;
            }
}
```

FIG. 11

```
aligned(8) class TrickPlayBox
            extends Fullbox('trik', version=0, flag)
{
            if (flags=0)
                        for (i=0; i<sample_count, i++){
                                    unsigned int(2) pic_type;
                                    unsigned int(6) dependency_level;
                        }
            else
                        for (i=0; i<sample_count, i++){
                                    unsigned int(4) pic_type;
                                    unsigned int(6) dependency_level;
                                    unsigned int(6) reserved;
                        }
}
```

FIG. 12

| pic_type | Description | Reference(nal_unit_type) |
|---|---|---|
| 0 | IDR without associated leading picture | IDR_N_LP |
| 1 | DR with Decodable Leading Picture | IDR_W_RADL |
| 2 | BDR with Decodable Leading Picture | BLA_N_LP |
| 3 | BLA may have associated RADL pictures but without associated RASL pictures | BLA_W_RADL |
| 4 | BLA may have associated RADL and RASL | BLA_W_LP |
| 5 | CRA may have associated leading pictures | CRA_NUT |
| 7 | Random access decodable leading picture | RADL_N, RADL_R |
| 8 | Random access skipped leading picture | RASL_N, RASL_R |
| 9 | Unconstrained I-picture | |
| 10 | Unknown | |
| 11~15 | Reserved | |

FIG. 13

```
aligned(8) class TrickPlayBox
              extends Fullbox('trikhvc', version=0, flags=0)
{
              for (i=0; i<sample_count, i++){
                            unsigned int(3) pic_type;
                            unsigned int(5) dependency_level;
              }
}
```

```
aligned(8) class TrickPlayBox
            extends Fullbox('trik', version=0, flags)
{
            if (flags=0)
                        for (i=0; i<sample_count, i++){
                                    unsigned int(2) pic_type;
                                    unsigned int(6) dependency_level;
                        }
            else
                        for (i=0; i<sample_count, i++){
                                    unsigned int(3) pic_type;
                                    unsigned int(5) dependency_level;
                        }
}
```

FIG. 16

```
aligned(8) class TrickPlayBox
            extends Fullbox('trikhvc', version=0, flags=0)
{
            for (i=0; i<sample_count, i++){
                        unsigned int(4) pic_type;
                        unsigned int(2) temporal_sub_layer_pic_type;
                        unsigned int(3) max_temporal_id;
                        unsigned int(3) temporal_id;
                        unsigned int(3) constraint_trick_play_mode;
                        unsigned int(1) reserved;
                        if (temporal_sub_layer_pic_type = 'TSA'){
                                    unsigned int(3) next_temporal_id;
                                    unsigned int(5) reserved;
                        }
                        else if (temporal_sub_layer_pic_type = 'STSA'){
                                    unsigned int(3) next_temporal_id;
                                    unsigned int(5) reserved;
                        }
            }
}
```

FIG. 17

```
aligned(8) class TrickPlayBox
            extends Fullbox('trik', version=0, flags)
{
            if (flags=0)
                        for (i=0; I<sample_count, i++){
                                    unsigned int(2) pic_type;
                                    unsigned int(6) dependency_level;
                        }
            else
                        for (i=0; I<sample_count, i++){
                                    unsigned int(4) pic_type;
                                    unsigned int(2) temporal_sub_layer_pic_type;
                                    unsigned int(3) max_temporal_id;
                                    unsigned int(3) temporal_id;
                                    unsigned int(3) constraint_trick_play_mode;
                                    unsigned int(1) reserved;
                                    if (temporal_sub_layer_pic_type = 'TSA'){
                                                unsigned int(3) next_temporal_id;
                                                unsigned int(5) reserved;
                                    }
                                    else if (temporal_sub_layer_pic_type = 'STSA'){
                                                unsigned int(3) next_temporal_id;
                                                unsigned int(5) reserved;
                                    }
                        }
}
```

FIG. 20

```
aligned(8) class TrickPlayBox
            extends Fullbox('trikhvc', version=0, flags=0)
{
            for (i=0; I<sample_count, i++){
                        unsigned int(4) pic_type;
                        unsigned int(2) temporal_sub_layer_pic_type;
                        unsigned int(3) max_temporal_id;
                        unsigned int(3) temporal_id;
                        if (temporal_sub_layer_pic_type = 'TSA'){
                                    unsigned int(3) next_temporal_id;
                                    unsigned int(5) reserved;
                        }
                        else if (temporal_sub_layer_pic_type = 'STSA'){
                                    unsigned int(3) next_temporal_id;
                                    unsigned int(5) reserved;
                        }
                        unsigned int(6) dependency_level;
            }
}
```

FIG. 21

```
aligned(8) class TrickPlayBox
              extends Fullbox('trik', version=0, flags)
{
              if (flags=0)
                            for (i=0; I<sample_count, i++){
                                          unsigned int(2) pic_type;
                                          unsigned int(6) dependency_level;
                            }
              else
                            for (i=0; I<sample_count, i++){
                                          unsigned int(4) pic_type;
                                          unsigned int(2) temporal_sub_layer_pic_type;
                                          unsigned int(3) maxtemporal_id;
                                          unsigned int(3) temporal_id;
                                          if (temporal_sub_layer_pic_type = 'TSA'){
                                                        unsigned int(3) next_temporal_id;
                                                        unsigned int(5) reserved;
                                          }
                                          else if (temporal_sub_layer_pic_type = 'STSA'){
                                                        unsigned int(3) next_temporal_id;
                                                        unsigned int(5) reserved;
                                          }
                                          unsigned int(6) dependency_level;
                            }
}
```

| nuh_temporal_id_plus1 | tier |
|---|---|
| 1 | 1 |
| 2 | 2 |
| 3 | 3 |
| 4 | 4 |

| nuh_temporal_id_plus1 | tier |
|---|---|
| 1 | 1 |
| 2 | 2 |
| 3 | 3 |
| 4 | 6 |

FIG. 29

| data_field_tag | Description |
|---|---|
| 0 x 00 | Reserved |
| 0 x 01 | Announcement switching data field |
| 0 x 02 | AU_information data field |
| 0 x 03 | PVR_assist_information data field |
| 0 x 04 | TSAP time line data field |
| 0 x 05 | HEVC temporal id tier mapping info data field |
| 0 x 06 to 0x9F | Reserved for future use |
| 0 x A0 to 0xFF | User defined |

FIG. 30

| Syntax | No. of bits | Format |
|---|---|---|
| HEVC_temporal_id_tier_mapping_info (payloadSize) { | | |
|   reserved | 6 | |
|   included_temporal_id_flag | 1 | |
|   temporal_sub_layer_dependency_flag | 1 | |
|   if(included_temporal_id_flag & temporal_sub_layer_dependency_flag){ | | |
|     max_temporal_id_plus1 | 3 | |
|     temporal_id_plus1 | 3 | |
|     reserved | 2 | |
|     if(max_temporal_id_plus1 > 1){ | | |
|       for(i=0; i<max_temporal_id_plus1 – 1; i++){ | 3 | |
|         curr_tier_num | 3 | |
|         trick_play_speed | 2 | |
|         reserved | | |
|       } | | |
|     } | | |
|   } | | |
| } | | |

FIG. 31

| trick play speed | Providable X speed |
|---|---|
| 0 | 1 |
| 1 | 2 |
| 2 | 4 |
| 3 | 8 |
| 4 | 16 |
| 5 | 32 |
| 6 | 64 |

FIG. 32

| Syntax | No. bits | Mnemonic |
|---|---|---|
| PVR_assist_information( ) { | | |
|     data_field_tag | 8 | uimsbf |
|     data_field_length | 8 | uimsbf |
|     if (data_field_length > 0) { | | |
|         PVR_assist_tier_pic_num | 3 | uimsbf |
|         PVR_assist_block_trick_mode_present_flag | 1 | bsibf |
|         PVR_assist_pic_struct_present_flag | 1 | bsibf |
|         PVR_assist_tier_next_pic_in_tier_present_flag | 1 | bsibf |
|         PVR_assist_substream_info_present_flag | 1 | bsibf |
|         PVR_assist_extension_present_flag | 1 | bsibf |
|         if (PVR_assist_extension_present_flag == "1"){ | | |
|             PVR_assist_segmentation_info_present_flag | 1 | bsibf |
|             PVR_assist_tier_m_cumulative_frames_present_flag | 1 | bsibf |
|             PVR_assist_tier_n_mmco_present_flag | 1 | bsibf |
|             PVR_assist_reserved_0 | 5 | "00000" |
|             if (PVR_assist_segmentation_info_present_flag == "1"){ | | |
|                 PVR_assist_seg_id | 8 | uimsbf |
|                 PVR_assist_prg_id | 16 | uimsbf |
|                 PVR_assist_seg_start_flag | 1 | bsibf |
|                 PVR_assist_seg_end_flag | 1 | bsibf |
|                 PVR_assist_prg_start_flag | 1 | bsibf |
|                 PVR_assist_prg_stop_flag | 1 | bsibf |
|                 PVR_assist_scene_change_flag | 1 | bsibf |
|                 PVR_assist_reserved_0 | 3 | "000" |
|             } | | |
|             if (PVR_assist_tier_m_cumulative_frames_present_flag == "1"){ | | |
|                 PVR_assist_tier_m | 3 | uimsbf |
|                 PVR_assist_tier_m_cumulative_frames | 5 | uimsbf |
|             } | | |
|             if (PVR_assist_tier_n_mmco_present_flag == "1") { | | |
|                 PVR_assist_tier_n_mmco | 3 | uimsbf |
|                 PVR_assist_reserved_0 | 5 | "00000" |
|             } | | |
|         } | | |
|     } | | |
| } | | |

FIG. 33

| Syntax | No. bits | Mnemonic |
|---|---|---|
| PVR_assist_information( ) { | | |
|     data_field_tag | 8 | uimsbf |
|     data_field_length | 8 | uimsbf |
|     if (data_field_length > 0) { | | |
|         PVR_assist_tier_pic_num | 3 | uimsbf |
|         PVR_assist_temporal_id_plus1 | 3 | uimsbf |
|         PVR_assist_block_trick_mode_present_flag | 1 | bsibf |
|         PVR_assist_pic_struct_present_flag | 1 | bsibf |
|         PVR_assist_tier_next_pic_in_tier_present_flag | 1 | bsibf |
|         PVR_assist_substream_info_present_flag | 1 | bsibf |
|         PVR_assist_extension_present_flag | 1 | bsibf |
|         PVR_assist_temporal_id_info_present_flag | 1 | bsibf |
| | | |
|         if (PVR_assist_temporal_id_info_present_flag == "1") { | | |
|             PVR_assist_max_temporal_id_plus1 | 3 | uimsbf |
|         } | | |
|     } | | |
| } | | |

FIG. 34

| Syntax | No. bits | Mnemonic |
|---|---|---|
| PVR_assist_information( ) { | | |
|     data_field_tag | 8 | uimsbf |
|     data_field_tag | 8 | uimsbf |
|     if (data_field_length > 0) { | | |
|         PVR_assist_tier_pic_num | 3 | uimsbf |
|         PVR_assist_tier_pic_num_to_temporal_id_flag | 3 | bsibf |
|         PVR_assist_block_trick_mode_present_flag | 1 | bsibf |
|         PVR_assist_pic_struct_present_flag | 1 | bsibf |
|         PVR_assist_tier_next_pic_in_tier_present_flag | 1 | bsibf |
|         PVR_assist_substream_info_present_flag | 1 | bsibf |
|         PVR_assist_extension_present_flag | 1 | bsibf |
|         PVR_assist_temporal_id_info_present_flag | 1 | bsibf |
|         if (PVR_assist_tier_pic_num_to_temporal_id_flag == 1 && PVR_assist_temporal_id_info_present_flag == "1") { | | |
|             PVR_assist_max_temporal_id_plus1 | 3 | uimsbf |
|         } | | |
|     } | | |
| } | | |

FIG. 35

| Syntax | No. bits | Mnemonic |
|---|---|---|
| PVR_assist_information( ) { | | |
| data_field_tag | 8 | uimsbf |
| data_field_length | 8 | uimsbf |
| if (data_field_length > 0) { | | |
|    PVR_assist_temporal_id_plus1 | 3 | uimsbf |
|    PVR_assist_substream_info_present_flag | 1 | bsibf |
|    PVR_assist_extension_present_flag | 1 | bsibf |
|    PVR_assist_temporal_id_present_flag | 1 | bsibf |
|    PVR_assist_temporal_sub_layer_dependency_flag | 1 | bsibf |
|    if (PVR_assist_temporal_id_present_flag == "1" && PVR_assist _temporal_sub_layer_dependency_flag == "1") { | | |
|       PVR_assist_max_temporal_id_plus1 | 3 | uimsbf |
|       If(PVR_assist_max_temporal_id_plus1> 1) { | | |
|          for(i=0; i<PVR_assist_max_temporal_id_plus1 – 1; i++) {   3 | | |
|            PVR_assist_curr_tier_num | 3 | uimsbf |
|            PVR_assist_trick_play_speed | 3 | uimsbf |
|            PVR_assist_reserved_0 | 2 | "00" |
|          } | | |
|       } | | |
|    } | | |
| } | | |
| } | | |

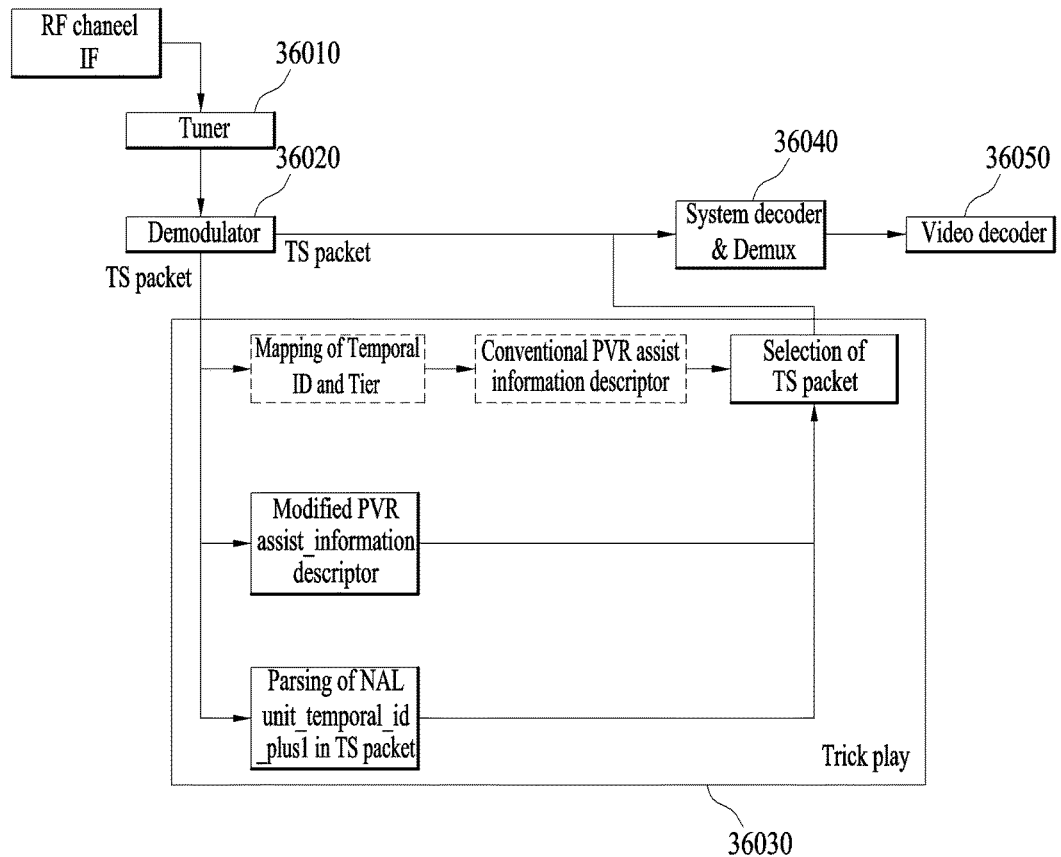

FIG. 38

| Syntax | No. bits | Mnemonic |
|---|---|---|
| PVR_assist_information( ) { | | |
|     data_field_tag | 8 | uimsbf |
|     data_field_length | 8 | uimsbf |
|     if (data_field_length > 0) { | | |
|         ......... | | |
|         PVR_assist_temporal_id_plus1 | 3 | uimsbf |
|         PVR_assist_temporal_id_info_present_flag | 1 | bsibf |
|         PVR_assist_intra_picture_flag | 1 | bsibf |
|         PVR_assist_reserved_0 | 3 | "000" |
|         If(PVR_assist_temporal_id_info_present_flag == "1") { | | |
|             PVR_assist_max_temporal_id_plus1 | 3 | uimsbf |
|             PVR_assist_PB_numbers_in_temporalId_zero | 3 | uimsbf |
|             PVR_assist_reserved_0 | 2 | "00000" |
|         } | | |
|         for (i=0; i<n; i+) + { | | |
|             PVR_assist_reserved_byte | 8 | uimsbf |
|         } | | |
|     } | | |
| } | | |

FIG. 46

| Syntax | No. of bits |
| --- | --- |
| sample_count | 32 |
| NAL_unit_type or Reference/Non-Reference picture | 8 |
| Temporal ID | 8 |

FIG. 47

| Syntax |
| --- |
| Aligned(8) class GOPSampleInfomationBox extends FullBox ('gsin', version=0, 0) {<br>    unsigned int(32) sample_count;<br>    for (i=0; i<sample_count; i++) {<br>       unsigned int(8) NAL_unit type;<br>       unsigned int(8) Temporal ID;<br>    }<br>} |

FIG. 48

```
aligned(8) class TrickPlayBox
            extends FullBox('trik', version=0, flags)
{
            if (flags=0)
                        for (i=0; I < sample_count; i++) {
                                    unsigned int(2)  pic_type;
                                    unsigned int(6)  dependency_level;
                        }
            else
                        for (i=0; I < sample_count; i++) {
                                    unsigned int(4)  pic_type;
                                    unsigned int(2)  temporal_sub_layer_pic_type;
                                    unsigned int(3)  max_temporal_id;
                                    unsigned int(3)  temporal_id;
                                    if( temporal_sub_layer_pic_type = 'TSA') {
                                                unsigned int(3)  next_temporal_id;
                                                unsigned int(5)  reserved;
                                    }
                                    else if( temporal_sub_layer_pic_type = 'STSA') {
                                                unsigned int(3)  next_temporal_id;
                                                unsigned int(5)  reserved;
                                    }
                                    unsigned int(6)  dependency_level;
                        }
}
```

SIGNAL TRANSMISSION AND RECEPTION APPARATUS AND SIGNAL TRANSMISSION AND RECEPTION METHOD FOR PROVIDING TRICK PLAY SERVICE

CROSS REFERENCE TO RELATED APPLICATIONS

This application is the National Phase of PCT International Application No. PCT/KR2015/001068, filed on Feb. 2, 2015, which claims priority under 35 U.S.C. 119(e) to U.S. Provisional Application No. 61/935,293, filed on Feb. 3, 2014, 61/954,615 filed on Mar. 18, 2014 and 61/970,910 filed on Mar. 27, 2014, all of which are hereby expressly incorporated by reference into the present application.

TECHNICAL FIELD

The present invention relates to a signal transmission/reception device and a signal transmission/reception method.

BACKGROUND ART

With the development of digital technology and communication technology, audio/video-based multimedia content has been increasingly distributed and requested in various fields, such as the Internet and personal media, as well as broadcasts and movies. In addition, consumers' demand for realistic media that provide a stereoscopic effect through broadcasts and movies has increased. Furthermore, as the size of TVs for homes is increased together with the development of display technology, consumers' demand for realistic content at a high quality of HD or higher level is increasing. Realistic broadcasts through an Ultra High Definition TV (UHDTV) and a 3DTV have attracted considerable attention as next-generation broadcast service. In particular, an Ultra High Definition (UHD) broadcast service has been increasingly discussed.

UHD broadcast content has higher quality than SD or HD broadcast content. For this reason, the amount of data to be transmitted is relatively large. In order to efficiently transmit such high-quality content, therefore new data compression methods have been developed. In recent years, an HEVC compression method, which is superior to a conventional H.264/AVC compression method, has been commercialized. Consequently, it is necessary to conduct research into a method of utilizing content data encoded using HEVC.

A trick play is possible for conventional encoded content. A trick play means a service providing a function that is capable of reproducing an image after a predetermined time, i.e. enabling random access, as well as an X speed function, such as an X2 speed and an X4 speed.

Conventionally, a trick play function is provided for a media service based on an AVC stream. For example, a trick play is possible for content H.264/AVC-encoded in a conventional Common File Format (CFF) medial file format.

A conventional receiver has a problem in that high processing speed for trick play cannot be achieved in a system level prior to video decoder input in the case of high-image quality of content (e.g. UHD 4K, 8K, etc.) during X speed reproduction with trick play. A video decoder in the conventional receiver cannot know information of each picture and, thus, an X speed reproduction function cannot be smoothly performed within a maximum bit rate range that can be generated in a receiver.

Accordingly, there is a problem in that each picture cannot be filtered prior to decoding of video data by a video decoder when the video data is transmitted and received between a receiver and an external storage or server.

DISCLOSURE

Technical Problem

An object of the present invention devised to solve the problem lies on a signal transmission/reception method and a signal transmission/reception device that are capable of more efficiently providing a trick play of an encoded stream.

Another object of the present invention devised to solve the problem lies on a signal transmission/reception method and a signal transmission/reception device that are capable of transmitting and receiving signaling information for a trick play of a stream based on a standardized encoding scheme, such as an AVC or HEVC stream.

Another object of the present invention devised to solve the problem lies on a signal transmission/reception method and a signal transmission/reception device that are capable of providing an extendable scheme in a case in which a trick play of an encoded steam is signaled.

Another object of the present invention devised to solve the problem lies on a signal transmission/reception method and a signal transmission/reception device that are capable of more efficiently executing a trick play while being compatible with a trick play scheme for HEVC-encoded content.

Another object of the present invention devised to solve the problem lies on a method and/or device for transmitting and receiving a broadcast signal for a trick play of HEVC-based broadcast content and a signal transmission/reception method and a signal transmission/reception device that are capable of defining a file format suitable for an HEVC stream so as to more efficiently provide a trick play.

A further object of the present invention devised to solve the problem lies on a signaling method that is capable of providing maximum X speed information to a user and a signal transmission/reception method and a signal transmission/reception device that are capable of providing a trick play using the temporal scalability of HEVC.

Technical Solution

The object of the present invention can be achieved by providing a method of transmitting a signal, the method including encoding video data, encoding a file format comprising the encoded video data, the file format comprising pre-filtering information for trick play, and transmitting data comprising the encoded file format The pre-filtering information may include transmission unit type information (NAL_unit_type) and temporal ID information (Temporal ID) of a picture or sample of the encoded video data.

The file format may include Base Media File Format or Common File Format, and the pre-filtering information may be included in box information included in the Base Media File Format or the Common File Format.

The transmitting of the data including the encoded file format may include generating a video stream comprising PVR assist information having a maximum temporal identification value, and transmitting the video stream.

In another aspect of the present invention, provided herein is a method of receiving a signal, the method including receiving file format data comprising encoded video data, parsing the received file format data to acquire pre-filtering information from the file format data and filtering pictures of the encoded video data, and decoding the filtered and transmitted video data and performing trick play on the video data.

In another aspect of the present invention, provided herein is an apparatus for transmitting a signal, the apparatus including a video encoder configured to encode video data, a file format converter configured to encode a file format comprising the encoded video data, the file format comprising pre-filtering information for trick play, and a transmitter configure to transmit data comprising the encoded file format.

In another aspect of the present invention, provided herein is an apparatus for receiving a signal, the apparatus including a receiver configured to receive file format data comprising encoded video data, a content parser configured to parse the received file format data to acquire pre-filtering information from the file format data and to filter pictures of the encoded video data, and a video decoder configured to decode the filtered and transmitted video data.

In another aspect of the present invention, provided herein is a method of transmitting a signal, the method including encoding video data to generate a video stream, the video stream comprising PVR assist information having a maximum temporal identification value of the video stream, and transmitting the generated video stream.

In another aspect of the present invention, provided herein is an apparatus for receiving a signal, the apparatus including a demultiplexer configured to demultiplex a received signal to extract a video stream, the video stream comprising PVR assist information having a maximum temporal identification value of the video stream, and a video decoder configured to decode the extracted video stream based on the PVR assist information and to perform trick play on the video data.

Advantageous Effects

According to an embodiment of the present invention, it is possible to more efficiently provide a trick play of an encoded stream.

According to an embodiment of the present invention, it is possible to transmit and receive signaling information for a trick play of a stream based on a standardized encoding scheme, such as an AVC or HEVC stream.

According to an embodiment of the present invention, it is possible to provide an extendable scheme in a case in which a trick play of an encoded steam is signaled.

According to an embodiment of the present invention, it is possible to more efficiently execute a trick play while being compatible with a trick play scheme for HEVC-encoded content.

According to an embodiment of the present invention, it is possible to provide a method and/or device for transmitting and receiving a broadcast signal for a trick play of HEVC-based broadcast content and to define a file format suitable for an HEVC stream so as to more efficiently provide a trick play.

According to an embodiment of the present invention, it is possible to provide a signaling method that is capable of providing maximum X speed information to a user and to provide a trick play using the temporal scalability of HEVC.

DESCRIPTION OF DRAWINGS

FIG. 1 is a view showing a signaling method for a trick play according to an embodiment of the present invention based on scenarios.

FIG. 2 is a view showing a Common File Format (CFF) box structure for supporting an HEVC-based stream according to an embodiment of the present invention.

FIG. 3 is a view showing syntax of an "hvcn" box according to an embodiment of the present invention.

FIG. 4 is a view showing an element supporting a High Dynamic Range (HDR) included in Common_Metadata according to an embodiment of the present invention.

FIG. 5 is a view showing a picture type for random access in a case of an HEVC stream according to an embodiment of the present invention.

FIG. 10 is a view showing the configuration of a trick play box for supporting a trick play of an HEVC stream having a max_temporal_id of 0 according to an embodiment of the present invention.

FIG. 11 is a view showing the configuration of a trick play box for supporting a trick play of an HEVC stream having a max_temporal_id of 0 according to another embodiment of the present invention.

FIG. 12 is a view showing the description of pic_type included in a trick play box for supporting a trick play of an HEVC stream having a max_temporal_id of 0 according to an embodiment of the present invention.

FIG. 13 is a view showing the configuration of a trick play box for supporting a trick play of an HEVC stream having a max_temporal_id of 0 in a case in which pic_type does not include contents related to a leading picture according to an embodiment of the present invention.

FIG. 16 is a view showing the configuration of a trick play box for restricting the maximum X speed to support a trick play in an HEVC stream supporting temporal scalability according to an embodiment of the present invention.

FIG. 17 is a view showing the configuration of a trick play box for restricting the maximum X speed to support a trick play in an HEVC stream supporting temporal scalability according to another embodiment of the present invention.

FIG. 20 is a view showing the configuration of a trick play box for supporting a high X speed trick play in an HEVC stream supporting temporal scalability according to an embodiment of the present invention (scenario 3).

FIG. 21 is a view showing the configuration of a trick play box for supporting a high X speed trick play in an HEVC stream supporting temporal scalability according to another embodiment of the present invention.

FIG. 29 is a view showing the configuration of an adaptation field of a TS packet including information for mapping of a temporal id and a tier according to an embodiment of the present invention.

FIG. 30 is a view showing the configuration of HEVC_temporal_id_tier_mapping_info according to an embodiment of the present invention.

FIG. 31 is a view showing the configuration of a trick_play_speed field included in HEVC_temporal_id_tier_mapping_info according to an embodiment of the present invention.

FIG. 32 is a view showing the configuration of PVR_assist_information according to an embodiment of the present invention.

FIG. 33 is a view showing the configuration of PVR_assist_information having a temporal id frame work added thereto according to an embodiment of the present invention.

FIG. 34 is a view showing the configuration of PVR_assist_information having a temporal id frame work added thereto according to another embodiment of the present invention.

FIG. 35 is a view showing the configuration of PVR_assist_information for supporting a trick play using a temporal id according to an embodiment of the present invention.

FIG. 36 is a view showing a receiving apparatus according to an embodiment of the present invention.

FIG. 37 is a view showing comparison between a tier framework and an HEVC temporal sub-layer according to an embodiment of the present invention.

FIG. 38 is a view showing the configuration of PVR_assist_information according to another embodiment of the present invention.

FIG. 46 is a diagram illustrating an example of the above exemplified pre-filtering information.

FIG. 47 is a diagram illustrating an example of a file transmission box including examples of the above exemplified pre-filtering information.

FIG. 48 is a diagram illustrating another example of a file transmission box including examples of the above exemplified pre-filtering information.

BEST MODE

Figure 6:
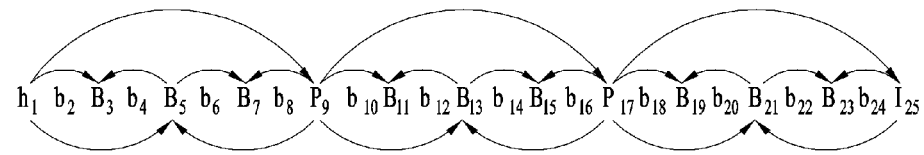
FIG. 6 is a view showing a trick play method in a case of a closed GOP according to an embodiment of the present invention.

For easy understanding of the present invention and the convenience of description, terms and abbreviations are defined as follows.

High Efficiency Video Coding (HEVC) is a high efficiency video coding standard providing the same video quality as a conventional H.265/AVC technology while having a compression rate about twice higher than that of the H.265/AVC technology.

Temporal scalability means a method of coding frames having different frame frequencies in the same spatial resolution A trick play means a function that is capable of reproducing an image after a random time, i.e. enabling random access, and providing an X speed function.

An Open GOP means a structure that is capable of encoding a picture in one GOP using a picture located before the corresponding GOP as a reference picture, i.e. a GOP including a leading picture.

A Closed GOP means a structure for encoding a picture in one GOP using only a picture in the corresponding GOP as a reference picture, i.e. a GOP not including a leading picture unlike the Open GOP.

The leading picture means a picture in HEVC having a later decoding order but an earlier reproduction order than IRAP.

Temporal id is a term introduced to support temporal scalability in HEVC and may be signaled by nuh_temporal_id_plus1 of NAL_unit_header.

Tier is a term introduced to support a trick play in an AVC stream or an mpeg-2 stream and may be included in an adaptation field in a TS packet.

FIG. 1 is a view showing a trick play method according to an embodiment of the present invention based on scenarios.

According to an embodiment of the present invention, a signaling method for a trick play may be defined based on whether to use temporal scalability of HEVC.

In a case in which a video stream according to an embodiment of the present invention is a stream which does not provide temporal scalability, i.e. in a case in which the video stream includes only a picture having a temporal_id of 0, for a Closed GOP, dependency_level and pic_type defined in a CFF media file format may be signaled to provide a trick play since the video stream does not include a leading picture (scenario 1-1). On the other hand, for an Open GOP, leading picture type may be included in pic_type and dependency_level may be signaled to provide a trick play (scenario 1-2).

In a case in which a video stream according to an embodiment of the present invention is a stream based on temporal scalability, i.e. in a case in which the video stream includes a picture having a temporal_id of more than 0, dependency_level, pic_type, and temporal_sub_layer_pic_type may be signaled to provide a trick play. More specifically, a supportable speed level may be signaled through temporal_id included in the stream to provide a trick play (scenario 2). In addition, a supportable X speed level may be signaled through temporal_id in the same manner as in scenario 2 and a picture having a temporal_id of 0 may be additionally used to provide an additional service for X speed (scenario 3).

A box shown in this figure may indicate a picture constituting a video stream and T_ID described in the box may mean temporal_id for supporting temporal scalability.

FIG. 2 is a view showing a Common File Format (CFF) box structure for supporting an HEVC-based stream according to an embodiment of the present invention.

In this figure, NL0", "NL1", and "NL2" may indicate an inclusion relationship of CFF boxes, "Format Req." may indicate existence or nonexistence of corresponding boxes and the number of the corresponding boxes, "Specification" may indicate a portion of standards defining the corresponding boxes, and "Description" may indicate the description of the corresponding boxes. In a case in which "Format Req." is "+", it may mean that one or more corresponding boxes exist. In a case in which "Format Req." is "0/1", it may mean that a corresponding box exists or does not exist. In a case in which "Format Req." is "1", it may mean that a corresponding box exists. In a case in which "Format Req." is "0", it may mean that a corresponding box does not exist.

This figure shows a CFF box structure according to an embodiment of the present invention in which a new trick play box for HEVC is added to a conventional CFF. In addition, a CFF box structure according to an embodiment of the present invention may include a storage box abbreviated to "hvcn" for supporting an HEVC-based nal unit.

FIG. 3 is a view showing syntax of an "hvcn" box according to an embodiment of the present invention.

According to an embodiment of the present invention, a CFF box structure may include a nal unit storage box abbreviated to "hvcn".

According to an embodiment of the present invention, the nal unit storage box may be defined per codec for a trick play.

According to an embodiment of the present invention, the nal unit storage box may not be defined per codec for a trick play and a HEVC trick box different from a conventional AVC trick box may be defined in a conventional "trick" box. In addition, AVC or a HEVC trick play may be selected according to a flag of the "trick" box.

In this figure, HEVCConfig may include a Sequence Parameter Set (SPS) and a Picture Parameter Set (PPS) of HEVC and video information, such as a VUI parameter, of the SPS.

FIG. 4 is a view showing an element supporting a High Dynamic Range (HDR) included in Common_Metadata according to an embodiment of the present invention.

Common_Metadata referred to by an xml box according to an embodiment of the present invention may include a HighDynamicRange element.

A HighDynamicRange element according to an embodiment of the present invention may have a value of string according to an xml schema. One HighDynamicRange element may exist or no HighDynamicRange element may exist.

A HighDynamicRange element according to an embodiment of the present invention may indicate the minimum luminance and/or the maximum luminance (min.luminance and/or max.luminance).

A HighDynamicRange element according to an embodiment of the present invention may profile values classified by the minimum luminance and/or the maximum luminance. For example, the HighDynamicRange element may indicate Conventional capacity (min: 0.1 cd/m2, max: 100 cd/m2), Mid capacity (min: 0.001 cd/m2, max: 1000 cd/m2), or High capacity (min: 0.0001 cd/m2, max: 10000 cd/m2).

FIG. 5 is a view showing a picture type for random access in a case of an HEVC stream according to an embodiment of the present invention.

This figure shows a picture type which may be the base for random access and execution of a trick play among HEVC NAL unit types.

A shaded picture type (TSA, STSA) in this figure may indicate an HEVC temporal sub-layer picture type which may be used for a trick play in a case in which a stream having a temporal ID of more than 0 is included, i.e. temporal scalability is provided. The shaded picture type may be used scenarios 2 and 3 according to an embodiment of the present invention.

According to an embodiment of the present invention, random access point pictures may include an Instantaneous Decoding Refresh (IDR) picture, a Broken Link Access (BLA) picture, and/or a Clean Random Access (CRA) picture, leading pictures may include a Random Access Decodable Leading (RADL) picture and/or a Random Access Skipped Leading (RASL) picture, and temporal sub-layer access pictures may include a Temporal Sub-layer Access (TSA) picture and/or a Step-wise Temporal Sub-layer Access (STSA) picture.

The Instantaneous Decoding Refresh (IDR) picture may include a case in which the IDR picture has a related leading picture and/or a case in which the IDR picture does not have a related leading picture.

The Broken Link Access (BLA) picture may include a case in which the BLA picture has a related RADL picture but does not have a related RASL picture and/or a case in which the BLA picture does not have a related leading picture.

The Clean Random Access (CRA) picture may include a case in which the CRA picture has a related leading picture.

The Temporal Sub-layer Access (TSA) picture may include a case in which the TSA picture is not referred to by the same sub-layer and/or a case in which the TSA picture is referred to by the same sub-layer.

The Step-wise Temporal Sub-layer Access (STSA) picture may include a case in which the STSA picture is not referred to by the same sub-layer and/or a case in which the STSA picture is referred to by the same sub-layer.

FIG. 6 is a view showing a trick play method in a case of a closed GOP according to an embodiment of the present invention (scenario 1-1).

This figure shows a method of executing a trick play in a case in which a maximum temporal_id in a video stream is 0 and in a case of a closed GOP. A GOP is short for a Group Of Pictures and indicates a group of coded pictures for enabling random access. A closed GOP may mean a GIOP which does not include a leading picture and an Open GOP may mean a GIOP which includes a leading picture. The leading picture may indicate a picture in HEVC having a later decoding order but an earlier display order than an Intra Random Access Point (IRAP) (the same concept as a random access point in AVC codec).

In this figure, one quadrilateral box may indicate one picture. A picture may be used as the same meaning as a frame and/or an image.

In this figure, a group of pictures I1 to P9 may indicate one GOP. Picture I, which is one of three picture types used for a MPEG coding signal, may include all data constituting one complete picture. That is, picture I may not refer to other pictures. Picture P may include only a difference value between estimated information obtained by observing a difference between a current picture and the previous picture in presentation order and real information. That is, picture P may refer to a picture existing before a current picture in presentation order. Picture B may include only estimated information obtained by observing a difference among a current picture, the previous picture, and the next picture in presentation order. That is, picture B may refer to pictures existing before and after a current picture. Arrows indicated in this figure may indicate reference among pictures. For example, picture B3 may refer to picture I1 and picture B5 to make a complete picture and picture P9 may refer to picture I1.

In this figure, numbers in the boxes may indicate a dependency_level of each picture. For example, a first picture may indicate a picture having a dependency_level of 1, a second picture may indicate a picture having a dependency_level of 5, and a third picture may indicate a picture having a dependency_level of 4.

According to an embodiment of the present invention, an X2 speed trick play may be executed by decoding pictures having a dependency_level value of 1 to 4. An X4 speed trick play may be executed by decoding pictures having a dependency_level value of 1 to 3. An X8 speed trick play may be executed by decoding pictures having a dependency_level value of 1 or 2. An X16 speed trick play may be executed by decoding pictures having a dependency_level value of 1.

Figure 7:
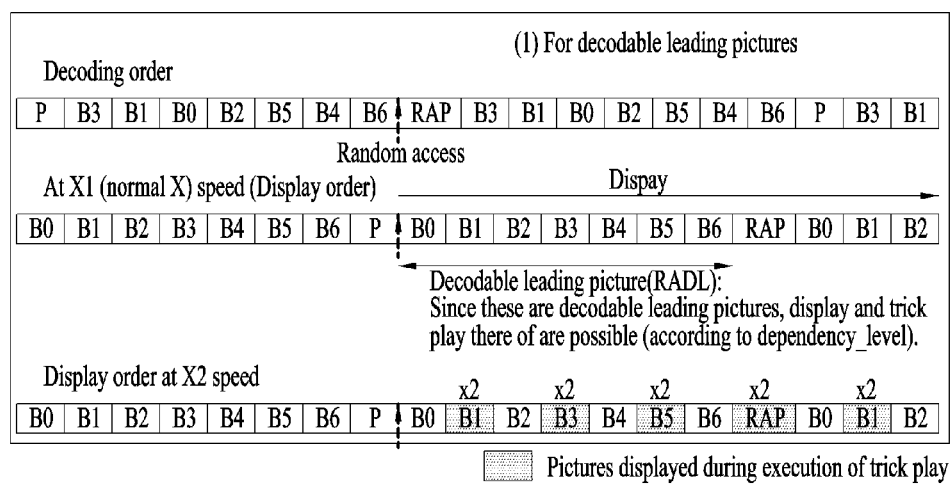
FIG. 7 is a view showing a trick play method in a case of an open GOP wherein the GOP includes a decodable leading picture according to an embodiment of the present invention.

FIG. 7 is a view showing a trick play method in a case of an open GOP wherein the GOP includes a decodable leading picture according to an embodiment of the present invention (scenario 1-2).

A first figure part shows a decoding order of pictures constituting a video stream, a second figure part shows a display order of pictures constituting a video stream at a normal X speed, and a third figure part shows a display order of pictures constituting a video stream during execution of an X2 speed trick play.

In the second figure part, marked pictures B0 to B6 may indicate a decodable leading picture.

Since the leading picture included in the GOP is a decodable leading picture in this figure, pictures may be displayed from a portion indicated by an arrow as shown in the second figure part and a trick play may be executed as shown in the third figure part. In a case in which an X2 speed trick play is executed, pictures B1, B3, B5, RAP, and B1 may be displayed according to a dependency_level of each picture as shown in the figure. A decodable leading picture may include a Random Access Decodable Leading (RADL) picture.

Figure 8:
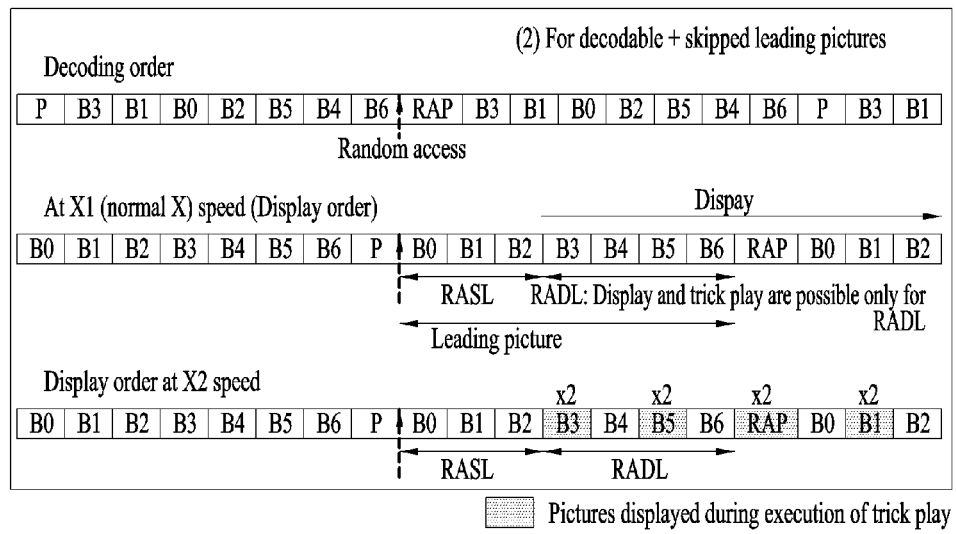
FIG. 8 is a view showing a trick play method in a case of an open GOP wherein the GOP includes a decodable leading picture and a skipped leading picture according to an embodiment of the present invention.

FIG. 8 is a view showing a trick play method in a case of an open GOP wherein the GOP includes a decodable leading picture and a skipped leading picture according to an embodiment of the present invention (scenario 1-2).

A first figure part shows a decoding order of pictures constituting a video stream, a second figure part shows a display order of pictures constituting a video stream at a normal X speed, and a third figure part shows a display order of pictures constituting a video stream during execution of an X2 speed trick play.

In the second and third figure parts, marked pictures B0 to B2 may indicate a skipped leading picture and marked pictures B3 to B6 may indicate a decodable leading picture.

In this figure, a skipped leading picture may not be displayed and a trick play may not be executed. Consequently, pictures may be displayed from picture B3 as shown in the second figure part and a trick play may be executed from picture B3 as shown in the third figure part. In a case in which an X2 speed trick play is executed, pictures B3, B5, RAP, and B1 may be displayed according to a dependency_level of each picture as shown in the figure. A decodable leading picture may include a Random Access Decodable Leading (RADL) picture and a skipped leading picture may include a Random Access Skipped Leading (RASL) picture.

Figure 9:
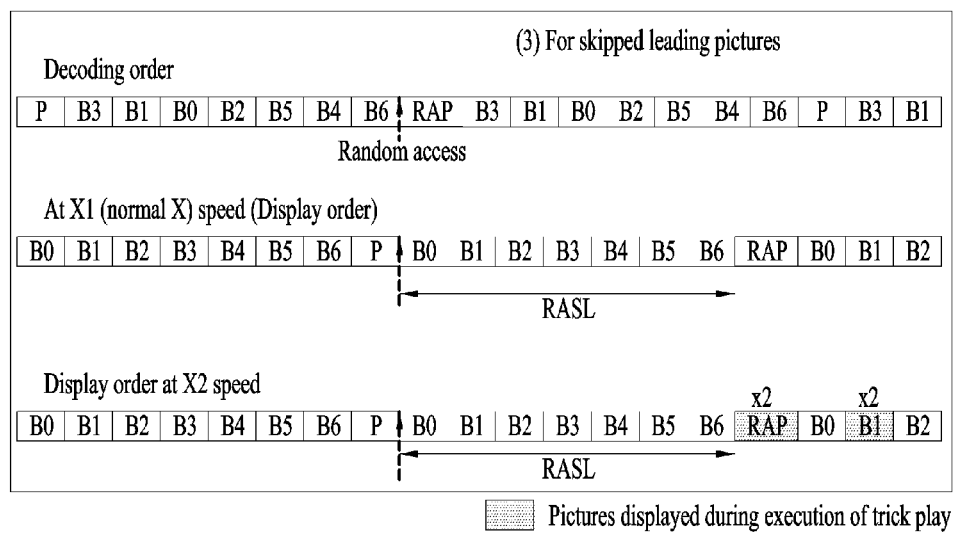
FIG. 9 is a view showing a trick play method in a case of an open GOP wherein the GOP includes a skipped leading picture according to an embodiment of the present invention.

FIG. 9 is a view showing a trick play method in a case of an open GOP wherein the GOP includes a skipped leading picture according to an embodiment of the present invention (scenario 1-2).

A first figure part shows a decoding order of pictures constituting a video stream, a second figure part shows a display order of pictures constituting a video stream at a normal X speed, and a third figure part shows a display order of pictures constituting a video stream during execution of an X2 speed trick play.

In the second and third figure parts, marked pictures B0 to B6 may indicate a skipped leading picture.

In this figure, a skipped leading picture may not be displayed and a trick play may not be executed. Consequently, pictures may be displayed from picture RAP as shown in the second figure part and pictures RAP and B1 may be displayed as shown in the third figure part in a case in which an X2 speed trick play is executed. A skipped leading picture may include a Random Access Skipped Leading (RASL) picture.

FIG. 10 is a view showing the configuration of a trick play box for supporting a trick play of an HEVC stream having a max_temporal_id of 0 according to an embodiment of the present invention (scenario 1-2).

This figure shows a signaling method of a trick play box for executing a trick play of a stream having a maximum temporal_id of 0.

According to an embodiment of the present invention, a new box "trikhvc" may be defined. A trikhvc box according to an embodiment of the present invention may include a pic_type field and/or a dependency_level field in a for loop repeated by a value of sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. The pic_type field may indicate a value of 4 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

FIG. 11 is a view showing the configuration of a trick play box for supporting a trick play of an HEVC stream having a max_temporal_id of 0 according to another embodiment of the present invention (scenario 1-2).

This figure shows a signaling method of a trick play box for executing a trick play of a stream having a maximum temporal_id of 0.

According to an embodiment of the present invention, a trick play of an HEVC stream may be executed using a conventionally defined box "trik". According to an embodiment of the present invention, an AVC or HEVC trick play may be selected using a flag.

A trik box according to an embodiment of the present invention may divide and signal a stream based on video codec using a flag. In addition, the trik box may include a pic_type field and/or a dependency_level field in a for loop repeated by a sample_count value.

In a case in which a value of flag according to an embodiment of the present invention is 0, the trik box may signal an H.264/AVC trick play. In a case in which a value of flag is 1, the trik box may signal an HEVC trick play.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. In a case in which a value of flag according to an embodiment of the present invention is 0, the pic_type field may indicate a value of 2 bits. In a case in which a value of flag is 1, the pic_type field may indicate a value of 4 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

FIG. 12 is a view showing the description of pic_type included in a trick play box for supporting a trick play of an HEVC stream having a max_temporal_id of 0 according to an embodiment of the present invention.

Pic_type according to an embodiment of the present invention may have a value of 0 to 15.

In a case in which a value of pic_type is 0, pic_type may indicate an IDR picture which does not have a related leading picture. In this case, nal_unit_type may indicate IDR_N_LP.

In a case in which a value of pic_type is 1, pic_type may indicate an IDR picture which has a related decodable leading picture. In this case, nal_unit_type may indicate IDR_W_RADL.

In a case in which a value of pic_type is 2, pic_type may indicate a BLA picture which has a related leading picture. In this case, nal_unit_type may indicate BLA_N_LP.

In a case in which a value of pic_type is 3, pic_type may indicate a BLA picture which has a related RADL picture but does not have a related RASL picture. In this case, nal_unit_type may indicate BLA_W_RADL.

In a case in which a value of pic_type is 4, pic_type may indicate a BLA picture which has a related RADL picture and a related RASL picture. In this case, nal_unit_type may indicate BLA_W_LP.

In a case in which a value of pic_type is 5, pic_type may indicate a CRA picture which has a related leading picture. In this case, nal_unit_type may indicate CRA_NUT.

In a case in which a value of pic_type is 7, pic_type may indicate a Random Access Decodable Leading (RADL) picture. In this case, nal_unit_type may indicate RADL_N or RADL_R.

In a case in which a value of pic_type is 8, pic_type may indicate a Random Access Skipped Leading (RASL) picture. In this case, nal_unit_type may indicate RASL_N or RASL_R.

In a case in which a value of pic_type is 9, pic_type may indicate undecided picture I.

A value of pic_type 10 may correspond to an unknown value.

Values of pic_type 11 to 15 may correspond to reserved values.

FIG. 13 is a view showing the configuration of a trick play box for supporting a trick play of an HEVC stream having a max_temporal_id of 0 in a case in which pic_type does not include contents related to a leading picture according to an embodiment of the present invention (scenario 1-1).

This figure shows a signaling method of a trick play box for executing a trick play of a stream having a maximum temporal_id of 0.

According to an embodiment of the present invention, a new box "trikhvc" may be defined. A trikhvc box according to an embodiment of the present invention may include a pic_type field and/or a dependency_level field in a for loop repeated by a sample_count value.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. The pic_type field may indicate a value of 3 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 5 bits.

Figures 14, 15:
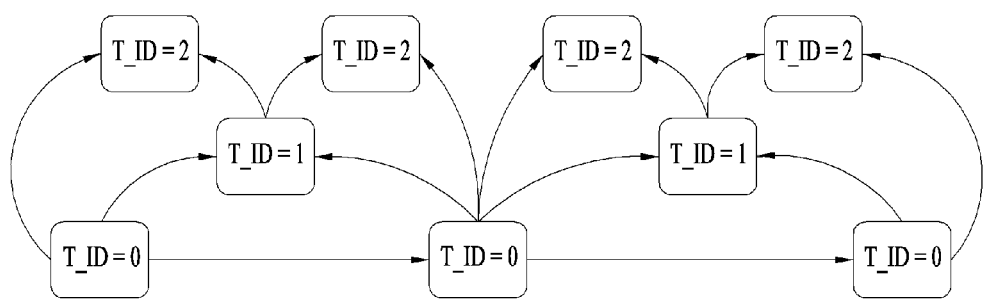
FIG. 14 is a view showing the configuration of a trick play box for supporting a trick play of an HEVC stream having a max_temporal_id of 0 in a case in which pic_type does not include contents related to a leading picture according to another embodiment of the present invention.
FIG. 15 is a view showing the configuration of an HEVC stream supporting temporal scalability according to an embodiment of the present invention.

FIG. 14 is a view showing the configuration of a trick play box for supporting a trick play of an HEVC stream having a max_temporal_id of 0 in a case in which pic_type does not include contents related to a leading picture according to another embodiment of the present invention (scenario 1-1).

This figure shows a signaling method of a trick play box for executing a trick play of a stream having a maximum temporal_id of 0.

According to an embodiment of the present invention, a trick play of an HEVC stream may be executed using a conventionally defined box "trik". According to an embodiment of the present invention, an AVC or HEVC trick play may be selected using a flag.

A trik box according to an embodiment of the present invention may include a pic_type field and/or a dependency_level field in a for loop repeated by a value of flag and sample_count.

In a case in which a value of flag according to an embodiment of the present invention is 0, the trik box may signal an H.264/AVC trick play. In a case in which a value of flag is 1, the trik box may signal an HEVC trick play.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. In a case in which a value of flag according to an embodiment of the present invention is 0, the pic_type field may indicate a value of 2 bits. In a case in which a value of flag is 1, the pic_type field may indicate a value of 3 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. In a case in which a value of flag according to an embodiment of the present invention is 0, the dependency_level field may indicate a value of 6 bits. In a case in which a value of flag is 1, the dependency_level field may indicate a value of 5 bits.

According to another embodiment of the present invention, pic_type may be configured as follows in a case in which a limitation that a leading picture is not displayed during execution of a trick play is included. In a case in which a value of pic_type is 0, pic_type may indicate that a corresponding sample is an unknown sample. In a case in which a value of pic_type is 1, pic_type may indicate that a corresponding sample is an IDR sample. In a case in which a value of pic_type is 2, pic_type may indicate that a corresponding sample is a CRA sample. In a case in which a value of pic_type is 3, pic_type may indicate that a corresponding sample is a BLA sample. In a case in which a value of pic_type is 4, pic_type may indicate that a corresponding sample is an unconstrained I sample. In this case, the number of bits assigned to the pic_type field and/or the dependency_level for the HEVE stream may be reduced. A sample may indicate the same meaning as a picture.

FIG. 15 is a view showing the configuration of an HEVC stream supporting temporal scalability according to an embodiment of the present invention.

In this figure, each quadrilateral box may indicate a picture included in a stream and T_ID may indicate temporal id.

FIG. 16 is a view showing the configuration of a trick play box for restricting the maximum X speed to support a trick play in an HEVC stream supporting temporal scalability according to an embodiment of the present invention (scenario 2).

This figure shows a method of signaling such that a maximally supportable X speed is restricted to support a trick play in a HEVC stream having a max_temporal_id of more than 0, i.e. supporting temporal scalability. For example, in a case in which a maximum temporal_id is 2, a maximum of X4 speed may be provided.

According to an embodiment of the present invention, a new box "trikhvc" may be defined. A trikhvc box according to an embodiment of the present invention may include a pic_type field, a temporal_sub_layer_pic_type field, a max_temporal_id field, a temporal_id field, a constraint_trick_play_mode field, and/or a next_temporal_id field in a for loop repeated by a value of sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. The pic_type field may indicate a value of 4 bits.

The temporal_sub_layer_pic_type field may indicate whether a corresponding picture is a Temporal Sub-layer Access (TSA) picture or a Step-wise Temporal Sub-layer Access (STSA) picture. In a case in which temporal_sub_layer_pic_type is 1, temporal_sub_layer_pic_type may indicate that a corresponding picture is a TSA picture. In a case in which temporal_sub_layer_pic_type is 2, temporal_sub_layer_pic_type may indicate that a corresponding picture is an STSA picture. In a case in which temporal_sub_layer_pic_type is 3, temporal_sub_layer_pic_type may indicate that a corresponding picture is an unknown picture. HEVC may classify temporal_sub_layer_access_pictures to provide temporal scalability and to adaptively change a frame rate. That is, HEVC may dynamically change a frame rate based on a TSA picture and an STSA picture in a layer not having a temporal_id of 0. There may be a difference between TSA and STSA in terms of how and how much a frame rate can be changed. That is, there may be a difference between TSA and STSA in terms of how many temporal_ids can be skipped at once. For example, on the assumption that, in a case in which temporal_id is 0, a frame rate is 15 p, in a case in which temporal_id is 1, a frame rate is 30 p, and, in a case in which temporal_id is 2 (max_temporal_id), a frame rate is 60 p, TSA may directly access a layer having a temporal_id of 2 from a layer having a temporal_id of 0 and, therefore, a broadcasting system may directly change a service such that a service having a frame rate of 60 p is provided while a service having a frame rate of 15 p is being provided. On the other hand, only stepwise access is possible for STSA and, therefore, STSA may access a layer having a temporal_id of 1 from a layer having a temporal_id of 0 and then access a layer having a temporal_id of 2. In this case, therefore, the broadcasting system may sequentially provide a service having a frame rate of 15 p, a service having a frame rate of 30 p, and a service having a frame rate of 60 p.

The max_temporal_id field may indicate a maximum value of temporal_id included in a stream.

The temporal_id field may indicate a value of temporal_id calculated using a value of nuh_temporal_id_plus1 of HEVC. A value of the temporal_id field may indicate a value obtained by subtracting 1 from a value of nuh_temporal_id_plus1.

The constraint_trick_play_mode field may indicate providable maximum X speed information. The present invention may signal a providable maximum X speed through an equation of max_trick_play_mode (providable maximum X speed)=2^(max_temporal_id) using a value of max_temporal_id. For example, in a case in which a maximum temporal_id is 2, the present invention may maximally provide an X4 speed (2^2). According to an embodiment of the present invention, the present invention may provide a limitation that a value less than the value calculated through the above-described equation is assigned to max_trick_play_mode. For example, in a case in which a value of max_trick_play_mode is 1, it may indicate an X2 speed. In a case in which a value of max_trick_play_mode is 2, it may indicate an X4 speed. In a case in which a value of max_trick_play_mode is 3, it may indicate an X8 speed. In a case in which a value of max_trick_play_mode is 4, it may indicate an X16 speed. Constraint_trick_play_mode may have the same meaning as max_trick_play_mode. According to an embodiment of the present invention, an X speed higher than max_trick_play_mode may not be supported but an X speed equal to max_trick_play_mode may be supported. In addition, according to an embodiment of the present invention, a constraint that a value less than a value of max_trick_play_mode is assigned may be signaled.

The next_temporal_id field may indicate a movable temporal_id to inform of a maximally changeable frame rate according to temporal_sub_layer_pic_type. For example, when it is necessary to return to a normal X speed (X1 speed) during provision of an X4 speed trick play for displaying only pictures having a temporal_id of 0 in a stream having a max_temporal_id of 2, next_temporal_id may have a value of max_temporal_id in a case in which temporal_sub_layer_pic_type is TSA. On the other hand, next_temporal_id may have a value obtained by adding 1 to a value of temporal_id in a case in which temporal_sub_layer_pic_type is STSA.

FIG. 17 is a view showing the configuration of a trick play box for restricting the maximum X speed to support a trick play in an HEVC stream supporting temporal scalability according to another embodiment of the present invention (scenario 2)

This figure shows a method of signaling such that a maximally supportable X speed is restricted to support a trick play in a HEVC stream having a max_temporal_id of more than 0, i.e. supporting temporal scalability. For example, in a case in which a maximum temporal_id is 2, a maximum of X4 speed may be provided.

According to an embodiment of the present invention, a trick play of an HEVC stream may be executed using a conventionally defined box "trik". According to an embodiment of the present invention, an AVC or HEVC trick play may be selected using a flag.

A trik box according to an embodiment of the present invention may include a pic_type field, dependency_level field, temporal_sub_layer_pic_type field, max_temporal_id field, temporal_id field, constraint_trick_play_mode field, and/or a next_temporal_id field in a for loop repeated by a value of flag and sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. In a case in which a value of flag according to an embodiment of the present invention is 0, the pic_type field may indicate a value of 2 bits. In a case in which a value of flag is 1, the pic_type field may indicate a value of 4 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

The temporal_sub_layer_pic_type field may indicate whether a corresponding picture is a Temporal Sub-layer Access (TSA) picture or a Step-wise Temporal Sub-layer Access (STSA) picture. In a case in which temporal_sub_layer_pic_type is 1, temporal_sub_layer_pic_type may indicate that a corresponding picture is a TSA picture. In a case in which temporal_sub_layer_pic_type is 2, temporal_sub_layer_pic_type may indicate that a corresponding picture is an STSA picture. In a case in which temporal_sub_layer_pic_type is 3, temporal_sub_layer_pic_type may indicate that a corresponding picture is an unknown picture. HEVC may classify temporal_sub_layer_access_pictures to provide temporal scalability and to adaptively change a frame rate. That is, HEVC may dynamically change a frame rate based on a TSA picture and an STSA picture in a layer not having a temporal_id of 0. There may be a difference between TSA and STSA in terms of how and how much a frame rate can be changed. That is, there may be a difference between TSA and STSA in terms of how many temporal_ids can be skipped at once. For example, on the assumption that, in a case in which temporal_id is 0, a frame rate is 15 p, in a case in which temporal_id is 1, a frame rate is 30 p, and, in a case in which temporal_id is 2 (max_temporal_id), a frame rate is 60 p, TSA may directly access a layer having a temporal_id of 2 from a layer having a temporal_id of 0 and, therefore, a broadcasting system may directly change a service such that a service having a frame rate of 60 p is provided while a service having a frame rate of 15 p is being provided. On the other hand, only stepwise access is possible for STSA and, therefore, STSA may access a layer having a temporal_id of 1 from a layer having a temporal_id of 0 and then access a layer having a temporal_id of 2. In this case, therefore, the broadcasting system may sequentially provide a service having a frame rate of 15 p, a service having a frame rate of 30 p, and a service having a frame rate of 60 p.

The max_temporal_id field may indicate a maximum value of temporal_id included in a stream.

The temporal_id field may indicate a value of temporal id calculated using a value of nuh_temporal_id_plus1 of HEVC. A value of the temporal_id field may indicate a value obtained by subtracting 1 from a value of nuh_temporal_id_plus1.

The constraint_trick_play_mode field may indicate providable maximum X speed information. The present invention may signal a providable maximum X speed through an equation of max_trick_play_mode (providable maximum X speed)=2^(max_temporal_id) using a value of max_temporal_id. For example, in a case in which a maximum temporal_id is 2, the present invention may maximally provide an X4 speed (2^2). According to an embodiment of the present invention, the present invention may provide a limitation that a value less than the value calculated through the above-described equation is assigned to max_trick_play_mode. For example, in a case in which a value of max_trick_play_mode is 1, it may indicate an X2 speed. In a case in which a value of max_trick_play_mode is 2, it may indicate an X4 speed. In a case in which a value of max_trick_play_mode is 3, it may indicate an X8 speed. In a case in which a value of max_trick_play_mode is 4, it may indicate an X16 speed. Constraint_trick_play_mode may have the same meaning as max_trick_play_mode.

The next_temporal_id field may indicate a movable temporal_id to inform of a maximally changeable frame rate according to temporal_sub_layer_pic_type. For example, when it is necessary to return to a normal X speed (X1 speed) during provision of an X4 speed trick play for displaying only pictures having a temporal_id of 0 in a stream having a max_temporal_id of 2, next_temporal_id may have a value of max_temporal_id in a case in which temporal_sub_layer_pic_type is TSA. On the other hand, next_temporal_id may have a value obtained by adding 1 to a value of temporal_id in a case in which temporal_sub_layer_pic_type is STSA.

Figure 18:
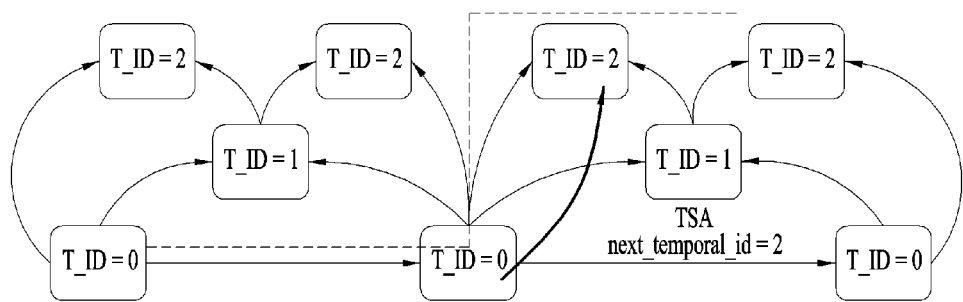
FIG. 18 is a view showing a frame rate changing method in a case in which a temporal sub-layer picture type is TSA according to an embodiment of the present invention.

FIG. 18 is a view showing a frame rate changing method in a case in which a temporal sub-layer picture type is TSA according to an embodiment of the present invention.

In a case in which a temporal sub-layer picture type is TSA as shown in this figure, a receiving side may directly display a stream at an X1 speed (normal X speed) during display of only a stream of a layer having a temporal_id of 0, i.e. during execution of a trick play at an X4 speed.

In a case in which a temporal sub-layer picture type is TSA as shown in this figure, the receiving side may directly decode and display a picture having a temporal_id of 2 during decoding and displaying of a picture having a temporal_id of 0.

Figure 19:
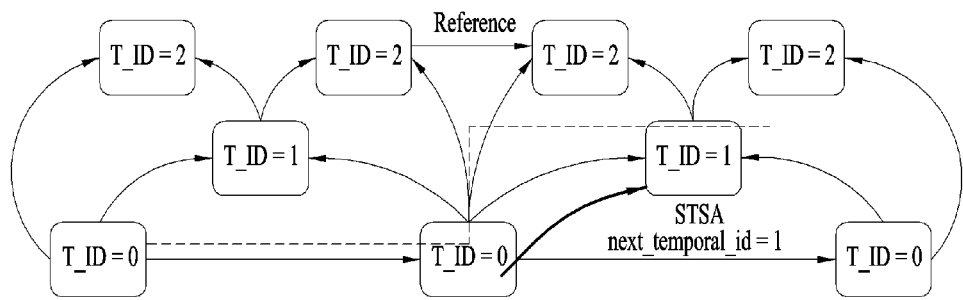
FIG. 19 is a view showing a frame rate changing method in a case in which a temporal sub-layer picture type is STSA according to an embodiment of the present invention.

FIG. 19 is a view showing a frame rate changing method in a case in which a temporal sub-layer picture type is STSA according to an embodiment of the present invention (scenario 3).

In a case in which a temporal sub-layer picture type is STSA as shown in this figure, a receiving side may not directly display a stream at an X1 speed (normal X speed) during display of only a stream of a layer having a temporal_id of 0, i.e. during execution of a trick play at an X4 speed. The receiving side may display a stream at an X2 speed and then display the stream at an X1 speed. In a case in which a temporal sub-layer picture type according to an embodiment of the present invention is STSA, therefore, a method of informing of a limitation for a convertible X speed may be needed. That is, it may be necessary to signal next_temporal_id.

In a case in which a temporal sub-layer picture type is STSA and it is necessary to display a stream at an X1 speed during displaying of the stream at an X4 speed as shown in this figure, the receiving side may not directly decode and display a picture having a temporal_id of 2 during decoding and displaying of a picture having a temporal_id of 0. The receiving side may decode and display a picture having a temporal_id of 1 and then decode and display a picture having a temporal_id of 2.

FIG. 20 is a view showing the configuration of a trick play box for supporting a high X speed trick play in an HEVC stream supporting temporal scalability according to an embodiment of the present invention (scenario 3).

According to an embodiment of the present invention, a new box "trikhvc" may be defined. A trikhvc box according to an embodiment of the present invention may include a pic_type field, a temporal_sub_layer_pic_type field, a max_temporal_id field, a temporal_id field, a next_temporal_id field, and/or a dependency_level field in a for loop repeated by a value of sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. The pic_type field may indicate a value of 4 bits.

The temporal_sub_layer_pic_type field may indicate whether a corresponding picture is a Temporal Sub-layer Access (TSA) picture or a Step-wise Temporal Sub-layer Access (STSA) picture. In a case in which temporal_sub_layer_pic_type is 1, temporal_sub_layer_pic_type may indicate that a corresponding picture is a TSA picture. In a case in which temporal_sub_layer_pic_type is 2, temporal_sub_layer_pic_type may indicate that a corresponding picture is an STSA picture. In a case in which temporal_sub_layer_pic_type is 3, temporal_sub_layer_pic_type may indicate that a corresponding picture is an unknown picture. HEVC may classify temporal_sub_layer_access_pictures to provide temporal scalability and to adaptively change a frame rate. That is, HEVC may dynamically change a frame rate based on a TSA picture and an STSA picture in a layer not having a temporal_id of 0. There may be a difference between TSA and STSA in terms of how and how much a frame rate can be changed. That is, there may be a difference between TSA and STSA in terms of how many temporal_ids can be skipped at once. For example, on the assumption that, in a case in which temporal_id is 0, a frame rate is 15 p, in a case in which temporal_id is 1, a frame rate is 30 p, and, in a case in which temporal_id is 2 (max_temporal_id), a frame rate is 60 p, TSA may directly access a layer having a temporal_id of 2 from a layer having a temporal_id of 0 and, therefore, a broadcasting system may directly change a service such that a service having a frame rate of 60 p is provided while a service having a frame rate of 15 p is being provided. On the other hand, only stepwise access is possible for STSA and, therefore, STSA may access a layer having a temporal_id of 1 from a layer having a temporal_id of 0 and then access a layer having a temporal_id of 2. In this case, therefore, the broadcasting system may sequentially provide a service having a frame rate of 15 p, a service having a frame rate of 30 p, and a service having a frame rate of 60 p.

The max_temporal_id field may indicate a maximum value of temporal_id included in a stream.

The temporal_id field may indicate a value of temporal_id calculated using a value of nuh_temporal_id_plus1 of HEVC. A value of the temporal_id field may indicate a value obtained by subtracting 1 from a value of nuh_temporal_id_plus1.

The next_temporal_id field may indicate a movable temporal_id to inform of a maximally changeable frame rate according to temporal_sub_layer_pic_type. For example, when it is necessary to return to a normal X speed (X1 speed) during provision of an X4 speed trick play for displaying only pictures having a temporal_id of 0 in a stream having a max_temporal_id of 2, next_temporal_id may have a value of max_temporal_id in a case in which temporal_sub_layer_pic_type is TSA. On the other hand, next_temporal_id may have a value obtained by adding 1 to a value of temporal_id in a case in which temporal_sub_layer_pic_type is STSA.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

According to an embodiment of the present invention, the trick play box shown in this figure may include a max_trick_play_mode field indicating the maximum X speed supportable in a trick play.

According to an embodiment of the present invention, in a case in which max_temporal_id is 2, the receiving side may decode only pictures having temporal_ids of 0 and 1 to provide an X2 speed trick play service. In addition, the receiving side may decode and display only pictures having a temporal_id of 0 to provide an X4 speed trick play service. Furthermore, the receiving side may classify pictures having a temporal_id of 0 according to dependency_level and decode and display only pictures having corresponding dependency_level to provide a higher than X4 speed trick play service.

FIG. 21 is a view showing the configuration of a trick play box for supporting a high X speed trick play in an HEVC stream supporting temporal scalability according to another embodiment of the present invention.

According to an embodiment of the present invention, a trick play of an HEVC stream may be executed using a conventionally defined box "trik". According to an embodiment of the present invention, an AVC or HEVC trick play may be selected using a flag.

A trik box according to an embodiment of the present invention may include a pic_type field, a dependency_level field, a temporal_sub_layer_pic_type field, a max_temporal_id field, a temporal_id field, and/or a next_temporal_id field in a for loop repeated by a value of flag and sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. In a case in which a value of flag according to an embodiment of the present invention is 0, the pic_type field may indicate a value of 2 bits. In a case in which a value of flag is 1, the pic_type field may indicate a value of 4 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

The temporal_sub_layer_pic_type field may indicate whether a corresponding picture is a Temporal Sub-layer Access (TSA) picture or a Step-wise Temporal Sub-layer Access (STSA) picture. In a case in which temporal_sub_layer_pic_type is 1, temporal_sub_layer_pic_type may indicate that a corresponding picture is a TSA picture. In a case in which temporal_sub_layer_pic_type is 2, temporal_sub_layer_pic_type may indicate that a corresponding picture is an STSA picture. In a case in which temporal_sub_layer_pic_type is 3, temporal_sub_layer_pic_type may indicate that a corresponding picture is an unknown picture. HEVC may classify temporal_sub_layer_access_pictures to provide temporal scalability and to adaptively change a frame rate. That is, HEVC may dynamically change a frame rate based on a TSA picture and an STSA picture in a layer not having a temporal_id of 0. There may be a difference between TSA and STSA in terms of how and how much a frame rate can be changed. That is, there may be a difference between TSA and STSA in terms of how many temporal_ids can be skipped at once. For example, on the assumption that, in a case in which temporal_id is 0, a frame rate is 15 p, in a case in which temporal_id is 1, a frame rate is 30 p, and, in a case in which temporal_id is 2 (max_temporal_id), a frame rate is 60 p, TSA may directly access a layer having a temporal_id of 2 from a layer having a temporal_id of 0 and, therefore, a broadcasting system may directly change a service such that a service having a frame rate of 60 p is provided while a service having a frame rate of 15 p is being provided. On the other hand, only stepwise access is possible for STSA and, therefore, STSA may access a layer having a temporal_id of 1 from a layer having a temporal_id of 0 and then access a layer having a temporal_id of 2. In this case, therefore, the broadcasting system may sequentially provide a service having a frame rate of 15 p, a service having a frame rate of 30 p, and a service having a frame rate of 60 p.

The max_temporal_id field may indicate a maximum value of temporal_id included in a stream.

The temporal_id field may indicate a value of temporal_id calculated using a value of nuh_temporal_id_plus1 of HEVC. A value of the temporal_id field may indicate a value obtained by subtracting 1 from a value of nuh_temporal_id_plus1.

The next_temporal_id field may indicate a movable temporal_id to inform of a maximally changeable frame rate according to temporal_sub_layer_pic_type. For example, when it is necessary to return to a normal X speed (X1 speed) during provision of an X4 speed trick play for displaying only pictures having a temporal_id of 0 in a stream having a max_temporal_id of 2, next_temporal_id may have a value of max_temporal_id in a case in which temporal_sub_layer_pic_type is TSA. On the other hand, next_temporal_id may have a value obtained by adding 1 to a value of temporal_id in a case in which temporal_sub_layer_pic_type is STSA.

According to an embodiment of the present invention, the trick play box shown in this figure may include a max_trick_play_mode field indicating the maximum X speed supportable in a trick play.

According to an embodiment of the present invention, in a case in which max_temporal_id is 2, the receiving side may decode only pictures having temporal_ids of 0 and 1 to provide an X2 speed trick play service. In addition, the receiving side may decode and display only pictures having a temporal_id of 0 to provide an X4 speed trick play service. Furthermore, the receiving side may classify pictures having a temporal_id of 0 according to dependency_level and decode and display only pictures having a corresponding dependency_level to provide a higher than X4 speed trick play service.

Figure 22:
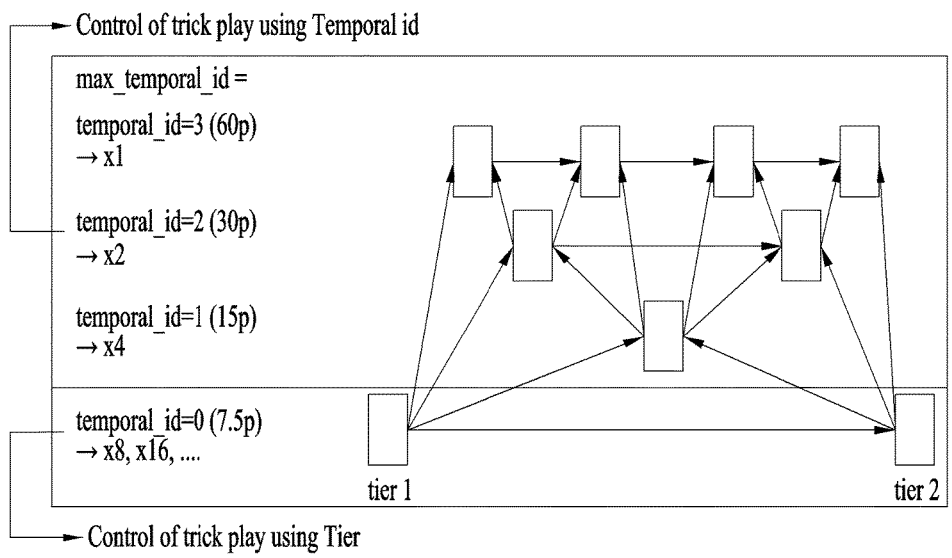
FIG. 22 is a view showing a trick play method using a temporal id and a tier according to an embodiment of the present invention.

FIG. 22 is a view showing a trick play method compositively using a temporal id and a tier according to an embodiment of the present invention.

According to an embodiment of the present invention, a tier value may be assigned to only a picture having a temporal id of 0.

As shown in this figure, a receiver according to an embodiment of the present invention may decode and display pictures having a temporal id of 0, 1, 2, or 3 to execute a normal X speed trick play, may decode and display pictures having a temporal id of 0, 1, or 2 to execute an X2 speed trick play, may decode and display pictures having a temporal id of 0 or 1 to execute an X4 speed trick play, and may decode and display pictures having a temporal id of 0 to execute an X8 speed trick play. The present invention may assign different tier values to pictures having a temporal id of 0 to execute a higher than X8 speed trick play.

According to an embodiment of the present invention, the following methods may be used to provide a trick play. A trick play may be provided by mapping a tier and a temporal id to use a PVR_assist_info descriptor (scenario A). A trick play may be provided by including a trick play using a temporal id in a PVR_assist_info descriptor (scenario B). A trick play may be provided by parsing nuh_temporal_id_plus1 information of NAL_unit_header and selecting only packets necessary for a real trick play (scenario C).

A temporal sub-layer or a temporal_id according to an embodiment of the present invention is a term introduced to support temporal scalability in HEVC and may be signaled by nuh_temporal_id_plus1 of NAL_unit_header.

A tier according to an embodiment of the present invention is a term introduced to support a trick play in an AVC stream or an mpeg-2 stream and may be included in an adaptation field in a TS packet.

Figure 23:
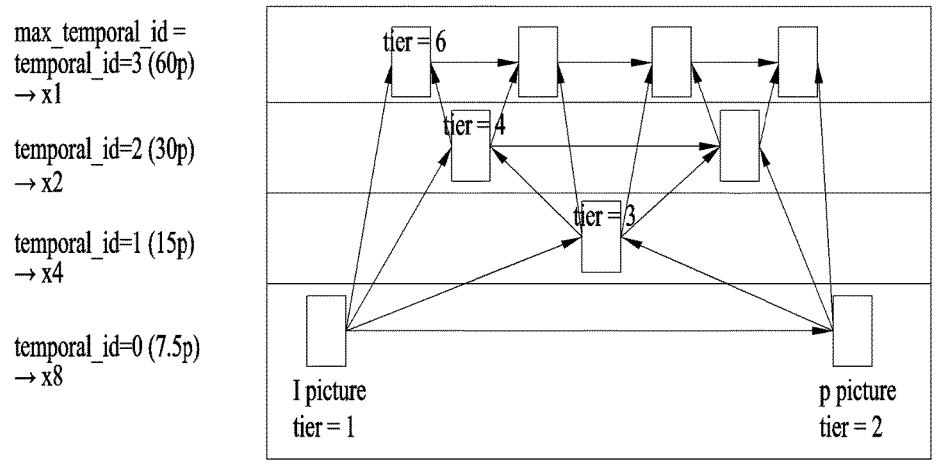
FIG. 23 is a view showing a trick play method based on a conventional tier concept according to an embodiment of the present invention.

FIG. 23 is a view showing a trick play method based on a conventional tier concept according to an embodiment of the present invention.

A conventional tier according to an embodiment of the present invention may indicate dependency between layers.

As shown in this figure, pictures having a temporal id of 3 may have a tier value of 6, pictures having a temporal id of 2 may have a tier value of 4, and pictures having a temporal id of 1 may have a tier value of 3. In addition, I pictures having a temporal id of 0 may have a tier value of 1 and I pictures having a temporal_id of 0 may have a tier value of 2. That is, pictures having a temporal_id of 0 may have the same temporal and different tier values.

According to an embodiment of the present invention, pictures having max_temporal_id, i.e. highest dependency_level, may have a tier value of 6 or 7. Pictures having other temporal_ids may have a tier value of 1 to 5. At this time, pictures corresponding to a layer having a temporal_id of 0 may have a tier value of 1 or 2 according to a picture type.

Figure 24:
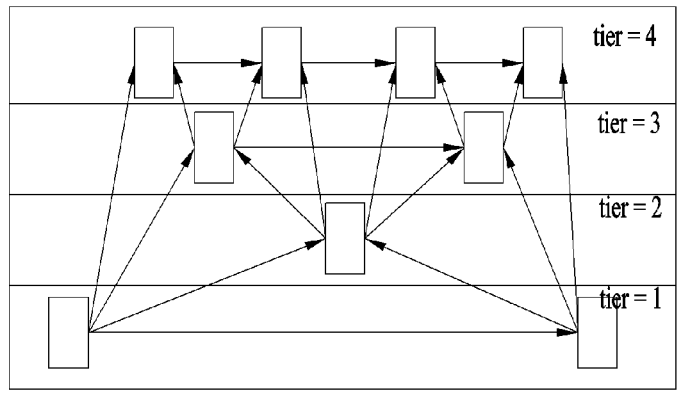
FIG. 24 is a view showing a trick play method based on a method of mapping one temporal id to one tier one to one according to an embodiment of the present invention.

FIG. 24 is a view showing a trick play method based on a method of mapping one temporal id to one tier one to one according to an embodiment of the present invention (scenario A-a).

According to an embodiment of the present invention, a method of mapping a temporal id and a tier may be used to provide a trick play based on an HEVC stream which includes a temporal id but does not include tier information (scenario A).

In order to provide a trick play according to an embodiment of the present invention, a method of mapping one temporal id to one tier one to one may be used (scenario A-a) and a method of mapping one temporal id to several tiers may be used (scenario A-b).

According to an embodiment of the present invention, in scenario A-a and scenario A-b as described above, a value of temporal id may be mapped to a tier one to one as it is irrespective of the meaning of a conventional tier.

According to another embodiment of the present invention, in scenario A-a and scenario A-b as described above, a value of temporal id may be mapped to a tier one to one and a maximum temporal id may be mapped to tier 6 or 7, which has meaning of a conventional tier as a discardable picture as it is.

According to scenario A as described above, most of a conventional PVR_assist_info descriptor may be used as it is. However, an embodiment of the present invention is based on a HEVC stream and, therefore, it is necessary to modify some fields included in the PVR_assist_info descriptor. For example, it may be newly defined that a PVR_assist_tier_m_cumulative_frames field included in the PVR_assist_info descriptor may deliver a value of the minimum number of frames extractable per 1.28 seconds from tier 1 through a PVR_assist_tier_m field (This field conveys the value of the intended minimum number of extractable frames per 1.28 sec. from tier 1 through "PVR_assist_teir_m").

This figure shows a trick play method based on scenario A-a according to an embodiment of the present invention.

As shown in this figure, pictures having a temporal id of 3 may be mapped to tier 4, pictures having a temporal id of 2 may be mapped to tier 3, pictures having a temporal id of 1 may be mapped to tier 2, and pictures having a temporal id of 0 may be mapped to tier 1.

Scenario A according to an embodiment of the present invention may not provide an 8× and higher speed trick play.

Figure 25:
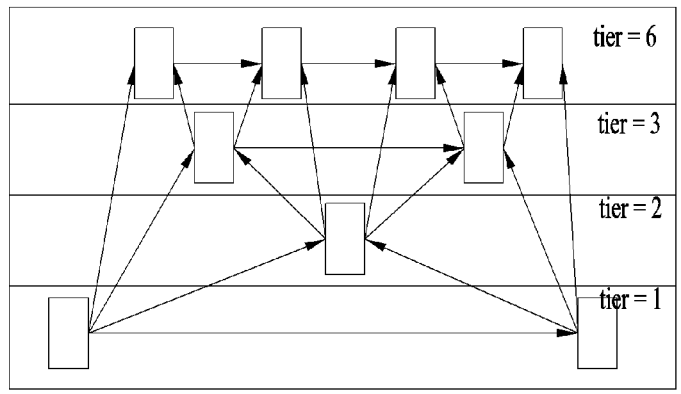
FIG. 25 is a view showing a trick play method based on a method of mapping one temporal id to one tier one to one according to another embodiment of the present invention.

FIG. 25 is a view showing a trick play method based on a method of mapping one temporal id to one tier one to one according to another embodiment of the present invention (scenario A-a).

According to an embodiment of the present invention, a value of temporal id may be mapped to a tier one to one and a maximum temporal id may be mapped to tier 6 or 7, which has meaning of a conventional tier as a discardable picture as it is unlike the previous figure.

As shown in this figure, pictures having a temporal id of 3 may be mapped to tier 6, pictures having a temporal id of 2 may be mapped to tier 3, pictures having a temporal id of 1 may be mapped to tier 2, and pictures having a temporal id of 0 may be mapped to tier 1.

This figure is different from the previous figure in that pictures corresponding to temporal id 3, which is a maximum temporal id, are mapped to tier 6.

Figures 26, 27, 28:
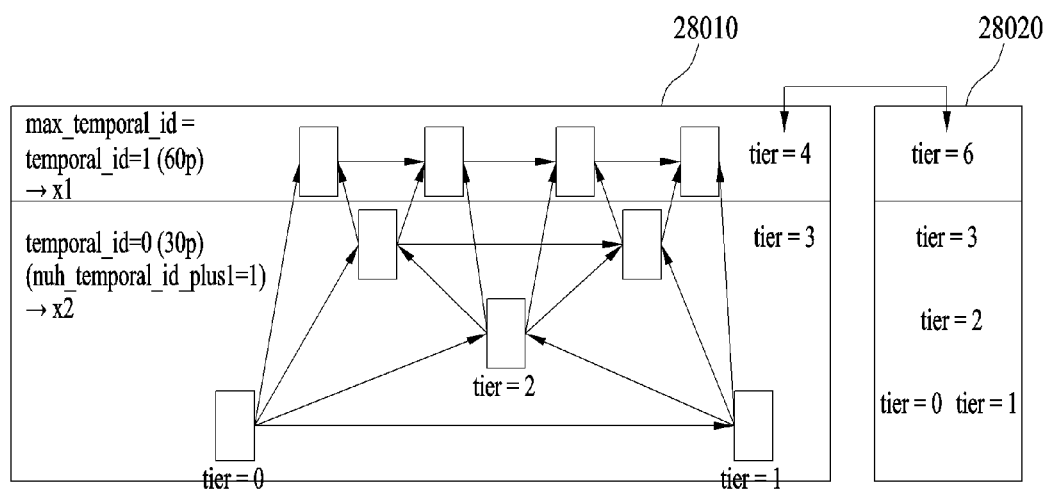
FIG. 26 is a view showing a result of mapping one temporal id to one tier one to one according to an embodiment of the present invention.
FIG. 27 is a view showing a result of mapping one temporal id to one tier one to one according to another embodiment of the present invention.
FIG. 28 is a view showing a trick play method based on a method of mapping one temporal id to several tiers according to an embodiment of the present invention.

FIG. 26 is a view showing a result of mapping one temporal id to one tier one to one according to an embodiment of the present invention.

This figure shows a result of mapping a value of temporal id to a tier one to one as it is irrespective of the meaning of a conventional tier in scenario A-a according to an embodiment of the present invention.

A nuh_temporal_id plus1 field shown in this figure may be a field included in NAL_unit_header and may indicate a value obtained by adding 1 to a temporal id. For example, in a case in which a value of the nuh_temporal_id plus1 field is 1, a temporal id may be 0. As shown in this figure, therefore, pictures having a temporal id of 0 may be mapped to tier 1, pictures having a temporal id of 1 may be mapped to tier 2, pictures having a temporal id of 2 may be mapped to tier 3, and pictures having a temporal id of 3 may be mapped to tier 4.

According to an embodiment of the present invention, a new tier mapped with a temporal id may be different in meaning from a conventionally used tier. Conventional tiers 6 and 7 may mean discardable pictures and tier 7 may mean a picture which is not used as reference. However, a tier newly defined through mapping may not have meaning of conventional tiers 6 and 7.

An embodiment of the present invention may map a temporal sub-layer and a tier so as to have the same number and may use the above-described mapping information when executing a trick play.

FIG. 27 is a view showing a result of mapping one temporal id to one tier one to one according to another embodiment of the present invention.

This figure shows a result of mapping a value of temporal id to a tier one to one and mapping a maximum temporal id to tier 6 or 7, which has meaning of a conventional tier as a discardable picture as it is in scenario A-a according to another embodiment of the present invention.

A nuh_temporal_id plus1 field shown in this figure may be a field included in NAL_unit_header and may indicate a value obtained by adding 1 to a temporal_id. For example, in a case in which a value of the nuh_temporal_id plus1 field is 1, a temporal id may be 0. As shown in this figure, therefore, pictures having a temporal id of 0 may be mapped to tier 1, pictures having a temporal id of 1 may be mapped to tier 2, pictures having a temporal id of 2 may be mapped to tier 3, and pictures having a temporal id of 3 may be mapped to tier 6.

According to an embodiment of the present invention, a new tier mapped with a temporal_id may be identical in meaning to a conventionally used tier. Tiers 6 and 7 may mean discardable pictures, tier 6 may mean a picture which is used as reference, and tier 7 may mean a picture which is not used as reference. As described above, therefore, pictures having a nuh_temporal_id plus1 of 4 may be mapped to tier 6. Pictures which are not used as reference may be mapped to tier 7.

FIG. 28 is a view showing a trick play method based on a method of mapping one temporal id to several tiers according to an embodiment of the present invention (scenario A-b).

As shown in this figure, pictures having a temporal id of 1, which is a maximum temporal id, may be mapped to tier 4 or 6 and the other five pictures having a temporal id of 0 may be mapped to tiers 0 to 3.

According to an embodiment of the present invention, a new tier mapped with a temporal id may be different in meaning from a conventionally used tier. Conventional tiers 6 and 7 may mean discardable pictures and tier 7 may mean a picture which is not used as reference. However, a tier newly defined through mapping may not have meaning of conventional tiers 6 and 7. As shown in this figure, therefore, pictures having a temporal id of 1 may be mapped to tier 4 (28010).

According to another embodiment of the present invention, a new tier mapped with a temporal id may be identical in meaning to a conventionally used tier. Tiers 6 and 7 may mean discardable pictures, tier 6 may mean a picture which is used as reference, and tier 7 may mean a picture which is not used as reference. As shown in this figure, therefore, pictures having a temporal id of 1 may be mapped to tier 6 (28020).

FIG. 29 is a view showing the configuration of an adaptation field of a TS packet including information for mapping of a temporal id and a tier according to an embodiment of the present invention.

An embodiment of the present invention may provide a descriptor for values of tier and nuh_temporal_id_plus1 with speed information for a trick play.

According to an embodiment of the present invention, information for a conventional trick play is included in an adaptation field of a TS packet and, therefore, HEVC_temporal_id_tier_mapping_info, which is information for a trick play of a HEVC stream including a temporal id, may also be included in the above-described adaptation field.

This figure shows the configuration of a data field included in the adaptation field of the TS packet.

As shown in this figure, in a case in which data_field_tag is 0x00, a corresponding data field may indicate a reserved field. In a case in which data_field_tag is 0x01, a corresponding data field may indicate an announcement switching data field. In a case in which data_field_tag is 0x02, a corresponding data field may indicate a data field for AU_information. In a case in which data_field_tag is 0x03, a corresponding data field may indicate a data field for PVR_assist_information. In a case in which data_field_tag is 0x04, a corresponding data field may indicate a data field indicating a TSAP time line. In a case in which data_field_tag is 0x05, a corresponding data field may indicate a data field for HEVC_temporal_id_tier_mapping_info.

An embodiment of the present invention may map a tier value to a temporal id using an HEVC_temporal_id_tier_mapping_info descriptor and provide a tier-based trick play using a PVR_assist_information descriptor.

FIG. 30 is a view showing the configuration of HEVC_temporal_id_tier_mapping_info according to an embodiment of the present invention.

HEVC_temporal_id_tier_mapping_info according to an embodiment of the present invention may include an included_temporal_id_flag field, a temporal_sub_layer_dependency_flag field, a max_temporal_id_plus1 field, a temporal_id_plus1 field, a curr_tier_num field, and/or a trick_play_speed field.

The included_temporal_id_flag field may signal whether encoding has been performed using a temporal_id.

The temporal_sub_layer_dependency_flag field may indicate dependency between temporal sub-layers. That is, the temporal_sub_layer_dependency_flag field has a value of 1 in a case in which a lower temporal sub-layer picture does not refer to an upper temporal sub-layer picture.

The max_temporal_id_plus1 field may indicate a maximum value of a temporal id. A value indicated by the max_temporal_id_plus1 field is a value obtained by adding 1 to a temporal id.

The temporal_id_plus1 field may have a value equal to a value indicated by nuh_temporal_id_plus1 included in an NAL unit header.

The curr_tier_num field may indicate a tier value mapped with temporal_id_plus1.

The trick_play_speed field may indicate a trick play speed that can be maximally provided according to a value of a temporal_id.

An if(max_temporal_id_plus1>1) condition statement may indicate a case in which max_temporal_id_plus1 is greater than 1, i.e. a stream using temporal scalability. In this case, a trick play may be provided using a temporal id and, therefore, an embodiment of the present invention may map a temporal id to a tier so as to use conventional PVR_assist_information.

Another embodiment of the present invention may locate the temporal_id_plus1 field in a for loop at the same level as the curr_tier_num field and the trick_play_speed and signal a tier number based on each temporal id and a speed for a trick play. An embodiment of the present invention may create a look up table using a descriptor including the above-described HEVC_temporal_id_tier_mapping_info and may interpret and use tier-related information of PVR_assist_information as temporal_id using the above-described look up table.

Another embodiment of the present invention may delete a for loop from the above-described HEVC_temporal_id_tier_mapping_info and locate the curr_tier_num field and the trick_play_speed at a level at which the temporal_id_plus1 field is located. An embodiment of the present invention may signal a descriptor including the above-described HEVC_temporal_id_tier_mapping_info per picture.

FIG. 31 is a view showing the configuration of a trick_play_speed field included in HEVC_temporal_id_tier_mapping_info according to an embodiment of the present invention.

In a case in which a trick_play_speed field according to an embodiment of the present invention is 0, a providable X speed of a trick play may be an X1 speed. In a case in which a trick_play_speed field is 1, a providable X speed of a trick play may be an X2 speed. In a case in which a trick_play_speed field is 2, a providable X speed of a trick play may be an X4 speed. In a case in which a trick_play_speed field is 3, a providable X speed of a trick play may be an X8 speed. In a case in which a trick_play_speed field is 4, a providable X speed of a trick play may be an X16 speed. In a case in which a trick_play_speed field is 5, a providable X speed of a trick play may be an X32 speed. In a case in which a trick_play_speed field is 6, a providable X speed of a trick play may be an X64 speed.

FIG. 32 is a view showing the configuration of PVR_assist_information according to an embodiment of the present invention.

PVR_assist_information according to an embodiment of the present invention may include a data_field_tag field, a data_field_length field, a PVR_assist_tier_pic_num field, a PVR_assist_block_trick_mode_present_flag field, a PVR_assist_pic_struct_present_flag field, a PVR_assist_tier_next_pic_in_tier_present_flag field, a PVR_assist_substream_info_present_flag field, a PVR_assist_extension_present_flag field, a PVR_assist_segmentation_info_present_flag field, a PVR_assist_tier_m_cumulative_frames_present_flag field, a PVR_assist_tier_n_mmco_present_flag field, a PVR_assist_reserved_0 field, a PVR_assist_seg_id field, a PVR_assist_prg_id field, a PVR_assist_seg_start_flag field, a PVR_assist_seg_end_flag field, a PVR_assist_prg_start_flag field, a PVR_assist_prg_stop_flag field, a PVR_assist_scene_change_flag field, a PVR_assist_tier_m field, a PVR_assist_tier_m_cumulative_frames field, and/or a PVR_assist_tier_n_mmco field.

The data_field_tag field may indicate that a corresponding data field is PVR_assist_information. The data_field_tag field may have a value of 0x03.

The data_field_length field may indicate a length of PVR_assist_information excluding the data_field_tag field and the data_field_length field.

The PVR_assist_tier_pic_num field may indicate a tier number of a picture related to PVR_assist_information. A minimum tier number may be 0 and a maximum tier number may be 7. Tier number 0 may be reserved for future use. According to an embodiment of the present invention, for HEVC, a tier number of a HEVC RAP picture may be 0 and a tier number of all other pictures different from the HEVC RAP may be a value obtained by adding 1 to a temporal id. According to an embodiment of the present invention, this field may indicate a tier number of a picture included in a video stream and may be named tier number information. The tier number may be used to signal a temporal sub-layer. PVR_assist_tier_pic_num may be named tier number information.

The PVR_assist_block_trick_mode_present_flag field may have a value of 1 at a picture which is not a RAP picture in a case in which this field has a value of 1 at the previous RAP picture.

The PVR_assist_pic_struct_present_flag field may have a value of 1 in a case in which a video stream is an AVC or HEVC stream and a PVR_assist_pict_struct field exists.

The PVR_assist_tier_next_pic_in_tier_present_flag field may have a value of 1 in a case in which a PVR_assist_tier_next_pic_in_tier field exists.

The PVR_assist_substream_info_present_flag may have a value of 1 in a case in which a PVR_assist_substream_info field exists.

The PVR_assist_extension_present_flag field may have a value of 1 in a case in which any one selected from among the PVR_assist_segmentation_info_present_flag field, the PVR_assist_tier_m_cumulative_frames_present_flag field, the PVR_assist_tier_n_mmco_present_flag field, and a PVR_assist_temporal_id_info_present_flag field has a value of 1.

The PVR_assist_segmentation_info_present_flag field may have a value of 1 in a case in which a PVR_assist_segmentation_info field exists.

The PVR_assist_tier_m_cumulative_frames_present_flag field may have a value of 1 in a case in which the PVR_assist_tier_m field and the PVR_assist_tier_m_cumulative_frames field exist. For HEVC, it may be recommended that this field has a value of 0.

The PVR_assist_tier_n_mmco_present_flag field may have a value of 1 in a case in which the PVR_assist_tier_n_mmco field exists. For HEVC, this field may have a value of 0.

The PVR_assist_seg_id field may deliver an id of a segment to which a picture belongs.

The PVR_assist_prg_id field may deliver an id of a program to which a picture belongs.

The PVR_assist_seg_start_flag field may have a value of 1 in a case of a picture having a first presentation order in one segment.

The PVR_assist_seg_end_flag field may have a value of 1 in a case of a picture having a last presentation order in one segment.

The PVR_assist_prg_start_flag field may have a value of 1 in a case of a picture having a first presentation order in one program.

The PVR_assist_prg_stop_flag field may have a value of 1 in a case of a picture having a last presentation order in one program.

The PVR_assist_scene_change_flag field may have a value of 1 in a case of a first picture of a new scene in presentation order.

The PVR_assist_tier_m field may indicate a tier number related to the PVR_assist_tier_m_cumulative_frames field. For HEVC, this field may not exist.

The PVR_assist_tier_m_cumulative_frames field may deliver a value of the minimum number of frames extractable per second from tier 1 through the PVR_assist_tier_m_ field.

The PVR_assist_tier_n_mmco field may indicate a minimum tier number below MMCOs which may be ignored by a decoder during execution of a trick play. For HEVC, this field may not exist.

PVR_assist_information according to an embodiment of the present invention may further include a PVR_assist_tier_next_pic_tier field. The PVR_assist_tier_next_pic_tier may indicate a relative position of the next picture in decoding order among pictures having a tier number equal to a value indicated by the PVR_assist_tier_pic_num field and may be named tier next picture information.

PVR_assist_information according to an embodiment of the present invention may include metadata for executing a trick play of video data and may be named PVR assist information.

FIG. 33 is a view showing the configuration of PVR_assist_information having a temporal_id frame work added thereto according to an embodiment of the present invention (scenario B-a-a).

An embodiment of the present invention may provide a method of including a trick play using a temporal_id in conventional PVR_assist_information included in an adaptation field of a TS packet. That is, an embodiment of the present invention may provide a temporal_id frame work.

An embodiment of the present invention may signal PVR_assist_temporal_id_plus1 together with conventional PVR_assist_tier_pic_num to support temporal scalability based on a temporal_id.

According to an embodiment of the present invention, PVR_assist_information may include all fields described above with reference to the previous figure showing the configuration of PVR_assist_information, a PVR_assist_temporal_id_plus1 field, PVR_assist_temporal_id_info_present_flag field, and/or a PVR_assist_max_temporal_id_plus1 field.

In this figure, fields having the same names as the fields described above with reference to the previous figure showing the configuration of PVR_assist_information may have the same meanings as the fields described above with reference to the previous figure.

The PVR_assist_temporal_id_plus1 field may indicate a value of a temporal id of a current frame and may actually indicate a value equal to a value of nuh_temporal_id_plus1 included in an NAL unit header.

The PVR_assist_temporal_id_info_present_flag field may include whether information related to a temporal_id is included. In a case in which the PVR_assist_max_temporal_id_plus1 field exists, this field may indicate a value of 1. This field may be provided for every RAP picture.

The PVR_assist_max_temporal_id_plus1 field may indicate a maximum value of a temporal id and may actually indicate a value obtained by adding 1 to the maximum value of the temporal id. This field may have a value of any one selected from among 0 to 6. This field may be used to provide information regarding speed of a trick play.

According to an embodiment of the present invention, an X speed of a trick play may be calculated using a value of the PVR_assist_max_temporal_id_plus1 field and a value of the PVR_assist_temporal_id_plus1 field.

FIG. 34 is a view showing the configuration of PVR_assist_information having a temporal id frame work added thereto according to another embodiment of the present invention (scenario B-a-b).

An embodiment of the present invention may provide a method of including a trick play using a temporal id in conventional PVR_assist_information included in an adaptation field of a TS packet. That is, an embodiment of the present invention may provide a temporal_id frame work.

An embodiment of the present invention may use a PVR_assist_tier_pic_num field as it is and may contain meaning of PVR_assist_temporal_id_plus1 in the PVR_assist_tier_pic_num field. In addition, an embodiment of the present invention may inform that meaning of a tier has been changed using a PVR_assist_tier_pic_num_to_temporal_id_flag field.

According to an embodiment of the present invention, PVR_assist_information may include all fields described above with reference to the previous figure showing the configuration of PVR_assist_information, a PVR_assist_tier_pic_num_to_temporal_id_flag field, a PVR_assist_temporal_id_info_present_flag field, and/or a PVR_assist_max_temporal_id_plus1 field.

In this figure, fields having the same names as the fields described above with reference to the previous figure showing the configuration of PVR_assist_information may have the same meanings as the fields described above with reference to the previous figure. However, the PVR_assist_tier_pic_num field may be used for the temporal_id frame work as it is according to an embodiment of the present invention. That is, the PVR_assist_tier_pic_num field may indicate a value of a temporal_id of a current frame and may actually have a value equal to a value of nuh_temporal_id_plus1 included in an NAL unit header.

The PVR_assist_tier_pic_num_to_temporal_id_flag field may have a value of 1 in a case in which the PVR_assist_tier_pic_num is used as a field indicating a temporal id.

The PVR_assist_temporal_id_info_present_flag field may indicate whether information related to a temporal id is included.

The PVR_assist_max_temporal_id_plus1 field may indicate a maximum value of a temporal id and may actually indicate a value obtained by adding 1 to the maximum value of the temporal id.

According to an embodiment of the present invention, an X speed of a trick play may be calculated using a value of the PVR_assist_tier_pic_num having meaning of the PVR_assist_max_temporal_id_plus1 field and the PVR_assist_temporal_id_plus1 field.

Another embodiment of the present invention may include a PVR_assist_framework field having a value of 2 bits or more in PVR_assist_information to classify types of frameworks providing PVR. An embodiment of the present invention may classify a conventional tier, a substream framework, and a temporal id framework. In this case, flag values included in conventional PVR_assist_information may not be used and an embodiment of the present invention may configure a condition statement on behalf of a tag value corresponding to each framework.

FIG. 35 is a view showing the configuration of PVR_assist_information for supporting a trick play using a temporal id according to an embodiment of the present invention (scenario B-b).

PVR_assist_information according to an embodiment of the present invention may include a data_field_tag field, a data_field_length field, a PVR_assist_temporal_id_plus1 field, a PVR_assist_substream_info_present_flag field, a PVR_assist_extension_present_flag field, a PVR_assist_temporal_id_present_flag field, a PVR_assist_temporal_sub_layer_dependency_flag field, a PVR_assist_max_temporal_id_plus1 field, a PVR_assist_curr_tier_num field, and/or a PVR_assist_trick_play_speed field.

The data_field_tag field may indicate that a corresponding data_field is PVR_assist_information. The data_field_tag field may have a value of 0x03.

The data_field_length field may indicate a length of PVR_assist_information excluding the data_field_tag field and the data_field_length field.

The PVR_assist_temporal_id_plus1 field may indicate a value of a temporal_id of a current frame and may actually indicate a value equal to a value of nuh_temporal_id_plus1 included in an NAL unit header.

The PVR_assist_substream_info_present_flag field may have a value of 1 in a case in which a PVR_assist_substream_info field exists.

The PVR_assist_extension_present_flag field may have a value of 1 in a case in which any one selected from among a PVR_assist_segmentation_info_present_flag field, a PVR_assist_tier_m_cumulative_frames_present_flag field, and a PVR_assist_tier_n_mmco_present_flag field has a value of 1.

The PVR_assist_temporal_id_info_present_flag field may indicate whether information related to a temporal_id is included.

The PVR_assist_temporal_sub_layer_dependency_flag field may indicate dependency between temporal sub-layers. That is, the temporal_sub_layer_dependency_flag field has a value of 1 in a case in which a lower temporal sub-layer picture does not refer to an upper temporal sub-layer picture.

The PVR_assist_max_temporal_id_plus1 field may indicate a maximum value of a temporal id and may actually indicate a value obtained by adding 1 to the maximum value of the temporal_id.

The PVR_assist_curr_tier_num field may indicate a tier value corresponding to temporal_id_plus1.

The trick_play_speed field may indicate a trick play speed that can be maximally provided according to a value of a temporal id.

An if(PVR_assist_max_temporal_id_plus1>1) condition statement may indicate a case in which PVR_assist_max_temporal_id_plus1 is greater than 1, i.e. a stream using temporal scalability. In this case, a trick play may be provided using a temporal_id.

Another embodiment of the present invention may locate the PVR_assist_temporal_id_plus1 field in a for loop at the same level as the PVR_assist_curr_tier_num field and the PVR_assist_trick_play_speed field and signal a tier number based on each temporal id and a speed for a trick play.

Another embodiment of the present invention may change and use a value of the PVR_assist_tier_pic_num field so as to indicate a value of the PVR_assist_temporal_id_plus1 field in a state in which the above-described field is left as it is. In this case, it is necessary to signal that meaning of the PVR_assist_tier_pic_num field has been changed using the PVR_assist_tier_pic_num_to_temporal_id_flag field.

A further embodiment of the present invention may provide a trick play using only a temporal id without a tier. That is, a trick play may be provided by parsing nuh_temporal_id_plus1 information of NAL_unit_header and selecting only packets necessary for a real trick play (scenario C). For example, in a case in which it is necessary to play a stream having a temporal_id of 0 to 3 at an X2 speed, an embodiment of the present invention may provide an X2 speed trick play by delivering only a TS packet having a nuh_temporal_id_plus1 value of 1, 2, or 3 to a system decoder.

FIG. 36 is a view showing a receiving apparatus according to an embodiment of the present invention.

A receiving apparatus according to an embodiment of the present invention may include a tuner 36010, a demodulator 36020, a trick play execution unit 36030, a system decoder and demux 36040, and/or a video decoder 36050.

The tuner 36010 may receive a broadcast signal transmitted through a broadcasting network, a cable network, and/or an Internet network.

The demodulator 36020 may demodulate a broadcast signal modulated according to a modulation method.

The trick play execution unit 36030 may select a TS packet for a trick play according to a method based on scenarios. Scenarios 1, 2, and 3 according to an embodiment of the present invention have been previously described in detail.

The system decoder and demux 36040 may decode system information and separate a multiplexed broadcast signal per unit stream. The demux may demultiplex a received broadcast signal to extract a video stream.

The video decoder 36050 may decode a video stream. The video decoder may include the system decoder and the trick play execution unit. The video decoder may execute a trick play of a video stream by decoding a video stream selected for a trick play based on the PVR assist information. The video decoder may execute a trick play based on the temporal identification information and the maximum temporal identification information included in the PVR assist information.

FIG. 37 is a view showing comparison between a tier framework and an HEVC temporal sub-layer according to an embodiment of the present invention.

A hierarchical structure of an HEVC temporal sub-layer according to an embodiment of the present invention is similar to a tier system framework. A temporal id according to an embodiment of the present invention may be matched to a tier number. An HEVC temporal sub-layer according to an embodiment of the present invention may support PVR using a method similar to the tier system framework.

An HEVC compliant encoder/decoder according to an embodiment of the present invention may support an HEVC temporal sub-layer. An temporal_id according to an embodiment of the present invention may exist in a stream encoded by HEVC. In a case in which a stream is encoded by a temporal sub-layer structure, any special encoding structure for a trick play may not be needed. Consequently, an HEVC temporal sub-layer according to an embodiment of the present invention may reduce an encoding burden in a case in which a trick play is supported.

As shown in this figure, in a tier framework, tier 7 means non-referenced discardable pictures and tier 6 means referenced discardable pictures. However, an HEVC temporal sub-layer according to an embodiment of the present invention may not classify referenced pictures and non-referenced pictures. In the tier framework, tier 1 indicates RAP pictures and tier 2 indicates P pictures. In an HEVC temporal sub-layer according to an embodiment of the present invention, however, temporal id 0 may indicate all of I pictures including TRAP pictures, P pictures, and B pictures.

According to an embodiment of the present invention, other sub-layers may be designated to temporal ids 6 and 7. As compared with tier numbers 6 and 7, therefore, an additional X speed may be supported in a case in which a temporal id is used according to an embodiment of the present invention.

According to an embodiment of the present invention, it may be necessary to classify frames in a base sub-layer having a temporal id of 0 so as to support a higher X speed.

FIG. 38 is a view showing the configuration of PVR_assist_information according to another embodiment of the present invention.

According to an embodiment of the present invention, a temporal id given to a video level may be signaled at a system level to filter access units (AUs) before a decoding procedure.

According to an embodiment of the present invention, an intra frame may be signaled in a base sub-layer having a temporal_id of 0 so as to support a higher X speed PVR_assist_information according to an embodiment of the present invention may include a data_field_tag field, a data_field_length field, a PVR_assist_temporal_id_plus1 field, a PVR_assist_temporal_id_info_present_flag field, a PVR_assist_intra_picture_flag field, a PVR_assist_max_temporal_id_plus1 field, a PVR_assist_PB_numbers_in_temporalid_zero field, a PVR_assist_reserved_0 field, and/or a PVR_assist_reserved_byte field.

The data_field_tag field may indicate that a corresponding data field is PVR_assist_information. The data_field_tag field may have a value of 0x03.

The data_field_length field may indicate a length of PVR_assist_information excluding the data_field_tag field and the data_field_length field.

The PVR_assist_temporal_id_plus1 field may indicate a temporal id of a picture. Actually, a temporal id may have a value obtained by subtracting 1 from a value of this field. This field may have a minimum value of 1 and a maximum value of 7. For a HEVC stream, this field may have a value equal to a value of nuh_temporal_id_plus1.

The PVR_assist_temporal_id_info_present_flag field may have a value of 1 in a case in which the PVR_assist_max_temporal_id_plus1 field exists. This field may be provided in only pictures corresponding to RAP pictures.

The PVR_assist_intra_picture_flag field may have a value of 1 in a case in which a current access unit is an intra picture.

The PVR_assist_max_temporal_id_plus1 field may indicate a maximum temporal id. Actually, the maximum temporal id may indicate a value obtained by subtracting 1 from a value of this field. This field may have a value of 1 to 7.

The PVR_assist_PB_numbers_in_temporalId_zero field may indicate the number of frames, existing between intra frames, different from the intra frames in a base sub-layer having a temporal_id of 0. This field may be used to estimate speed of a trick play.

The PVR_assist_reserved_0 field is a field reserved for future use.

The PVR_assist_reserved_byte field may indicate a field reserved for future use.

Figure 39:
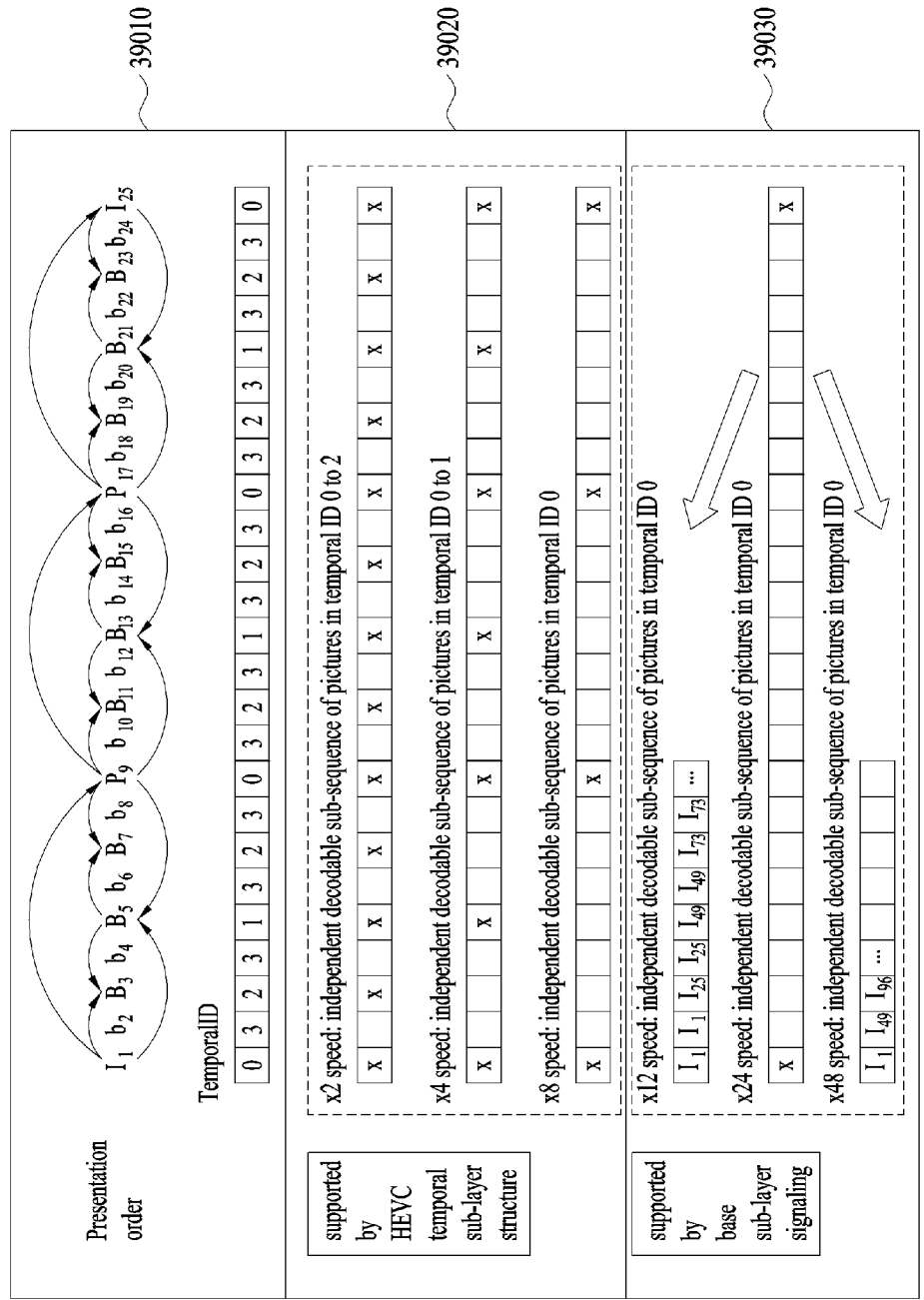
FIG. 39 is a view showing a trick play method using an HEVC temporal sub-layer according to an embodiment of the present invention.

FIG. 39 is a view showing a trick play method using an HEVC temporal sub-layer according to an embodiment of the present invention.

A first figure part 39010 of this figure shows that pictures corresponding to one GOP are arranged in presentation order. In the first figure part, I may indicate I pictures, B may indicate B pictures, and P may indicate P pictures. In addition, numerical subscripts of the alphabet indicating picture types may indicate presentation order. In the first figure part, arrows may indicate reference relationship among pictures.

A second figure part 39020 of this figure shows a method of providing a trick play using an HEVC temporal sub-layer according to an embodiment of the present invention. One quadrilateral box may indicate one picture. A number in each quadrilateral box may indicate a temporal id. Symbol x shown in each quadrilateral box may indicate a picture decoded and presented during execution of a trick play. As shown in the second figure part, X2 to X8 speed trick plays may be provided by the HEVC temporal sub-layer.

A third figure part 39030 of this figure shows a method of providing a trick play using base sub-layer signaling according to an embodiment of the present invention. An embodiment of the present invention may decode and present only intra pictures to provide X12, X24, and X48 speed trick plays.

Figure 40:
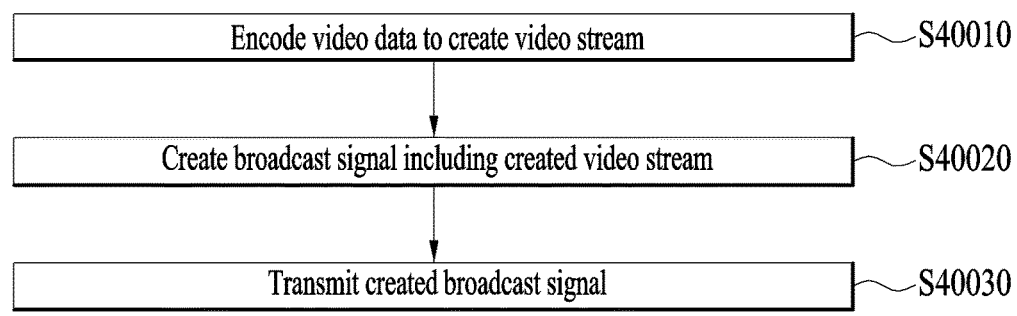
FIG. 40 is a view showing a broadcast signal transmission method according to an embodiment of the present invention.

FIG. 40 is a view showing a broadcast signal transmission method according to an embodiment of the present invention.

An embodiment of the present invention may transmit a broadcast signal through the following procedures. First, an embodiment of the present invention may encode video data so as to create a video stream (S40010). The video stream may be encoded using an AVC or HEVC codec. The video stream may include PVR assist information having a maximum temporal identification information value of the video stream. The maximum temporal identification information may be named max_temporal_id or PVR_assist_max_temporal_id. The maximum temporal identification information has been previously described in detail with reference to FIGS. 30, 33, 34, 35, and 38. The PVR assist information may mean information that is necessary for a receiver or a PVR apparatus in order to execute a trick play of video data. The PVR assist information has been previously described in detail with reference to FIG. 34. Next, an embodiment of the present invention may create a broadcast signal including the created video stream (S40020). The video stream may mean a video unit stream, a PES stream having a packetized video unit stream, or a transport stream having a TS packet. The created video stream may be modulated using various modulation methods in order to create a broadcast signal. Next, an embodiment of the present invention may transmit the created broadcast signal (S40030). An embodiment of the present invention may transmit a created broadcast signal through at least one selected from among a terrestrial broadcasting network, a cable network, and an Internet network.

According to another embodiment of the present invention, a video stream may include an adaptation field, and the adaptation field may include PVR assist information. The adaptation field, which is a field existing between a header and a payload of a TS packet, may include data. A video stream according to an embodiment of the present invention may be a stream including several TS packets. Consequently, a video stream according to an embodiment of the present invention may include an adaptation field.

According to another embodiment of the present invention, an adaptation field may include a private data byte field, and the private data byte field may include PVR assist information. The private data byte field may be included in the adaptation field, and may include several data fields. One of the above-described several data fields may include PVR assist information.

According to another embodiment of the present invention, a video stream may include one or more temporal sub-layers and each temporal sub-layer may indicate a group of pictures. A NAL unit header including encoded video data according to an embodiment of the present invention may include temporal identification plus information. The temporal identification plus information may indicate a value obtained by adding 1 to a value of temporal identification information and the temporal identification information may include information for identifying a temporal sub-layer. Temporal identification plus information according to an embodiment of the present invention may be used to identify a temporal sub-layer. The temporal sub-layer may be named a temporal sub-layer, the temporal identification information may be named a temporal id, and the temporal identification plus information may be named nuh_temporal_id_plus1.

According to another embodiment of the present invention, PVR assist information may include maximum temporal identification information indicating a maximum temporal identification information value of a video stream. A video stream encoded by HEVC may have several temporal sub-layers and each temporal sub-layer may be identified by temporal identification information. Maximum temporal identification information according to an embodiment of the present invention may mean temporal identification information of a temporal sub-layer having maximum temporal identification information among several temporal sub-layers.

According to another embodiment of the present invention, maximum temporal identification information may have a value of any integer selected from among 0 to 6. According to another embodiment of the present invention, therefore, a temporal identification information value may match with a tier number within a conventionally defined range of the tier number in a case in which the temporal identification information value matches with the tier number one to one. Conventionally, the tier number is defined from 0 to 7.

According to another embodiment of the present invention, maximum temporal identification information may be used to provide information regarding speed of a trick play. The maximum temporal identification information may signal information regarding the maximum X speed of a trick play. An embodiment of the present invention may signal an X speed of a trick play corresponding to each piece of temporal identification information. An embodiment of the present invention may inform a user of information regarding a serviceable maximum X speed by signaling the maximum temporal identification information, set the X speed of the trick play according to a request of the user, and provide the trick play at the set X speed to the user, which has been previously described in detail with reference to FIGS. 33 and 38.

According to another embodiment of the present invention, PVR assist information may include temporal identification flag information indicating whether maximum temporal identification information is included. The temporal identification flag information may be provided for at least every RAP. The temporal identification flag information may be named PVR_assist_temporal_id_info_present_flag. The temporal identification flag information may have a value of 1 in a case in which the maximum temporal identification information is included in the PVR assist information. For an AVC stream, the temporal identification flag information may have a value of 0. An embodiment of the present invention may signal maximum temporal identification information every RAP since temporal identification flag information is provided for every RAP. Consequently, an embodiment of the present invention may signal maximum X speed information of a trick play every RAP, which has been previously described in detail with reference to FIGS. 32 and 38.

Figure 41:
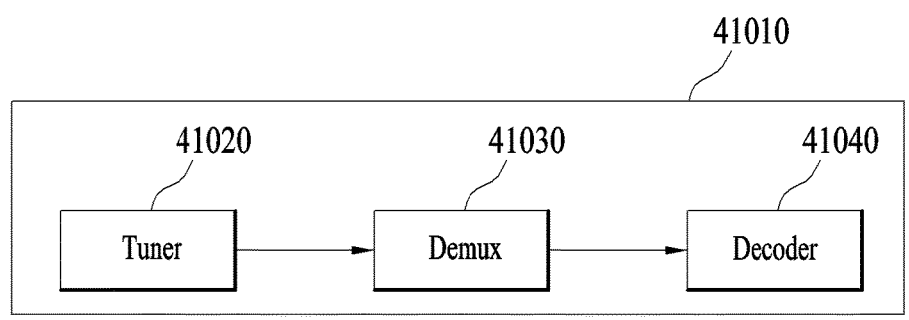
FIG. 41 is a view showing the structure of a broadcast signal receiving apparatus according to an embodiment of the present invention.

FIG. 41 is a view showing the structure of a broadcast signal receiving apparatus according to an embodiment of the present invention.

A broadcast signal receiving apparatus 41010 according to an embodiment of the present invention may include a tuner 41020, a demux 41030, and/or a decoder 41040.

The tuner may receive a broadcast signal.

The demux may demultiplex the received broadcast signal to extract a video stream. The video stream may include PVR assist information having a maximum temporal identification information value of the video stream.

The decoder may decode the extracted video stream based on the PVR assist information, and may execute a trick play of video data.

Components of a broadcast signal receiving apparatus according to an embodiment of the present invention shown in this figure having the same names as those of the broadcast signal receiving apparatus shown in FIG. 36 may perform the same functions as those of the broadcast signal receiving apparatus shown in FIG. 36.

Components of a broadcast signal receiving apparatus according to an embodiment of the present invention shown in this figure corresponding to the procedures of the broadcast signal transmission method shown in FIG. 40 may perform functions corresponding to the procedures of the broadcast signal transmission method shown in FIG. 40.

Hereinafter, an embodiment that is capable of efficiently executing a trick play at a video data level in addition to the above PED level for signal transmission will be disclosed.

In the disclosed embodiment, it is possible to transmit and receive information regarding a trick play so as to efficiently execute a video trick play at a video transmission step.

Separately from the disclosed embodiment or in addition to the disclosed embodiment, in a case in which information regarding a trick play signaled in advance at the video data level, the video decoder may obtain the information regarding the trick play, and may efficiently execute the trick play.

Hereinafter, embodiments of the present invention will be described in detail with reference to the drawings.

Figure 42:
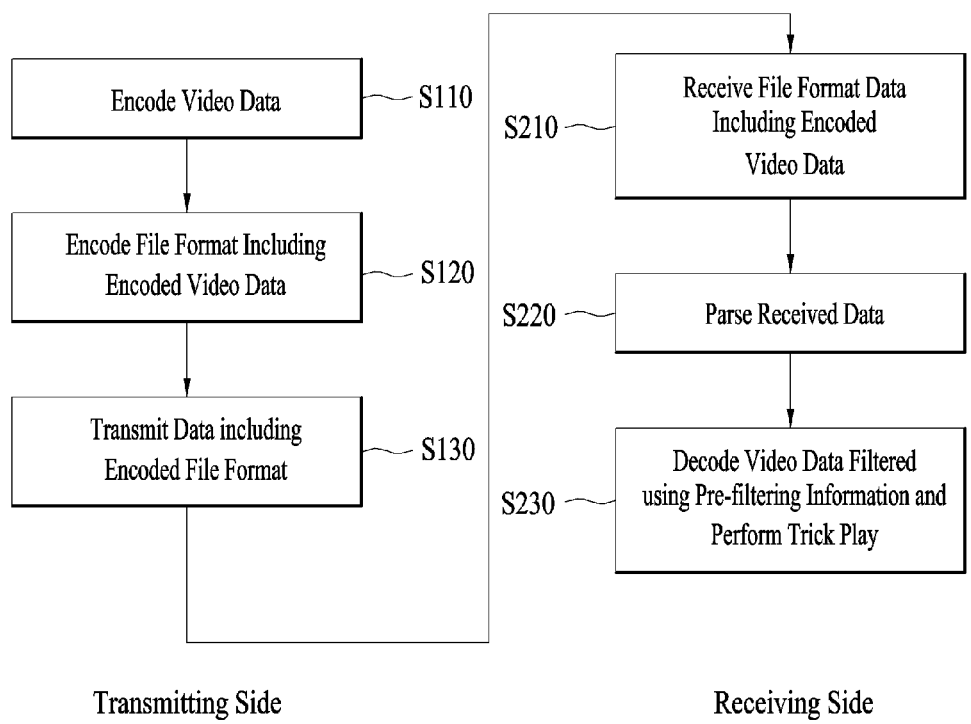
FIG. 42 is a view showing an embodiment of a signal transmission/reception method according to the present invention.

FIG. 42 is a view showing an embodiment of a signal transmission/reception method according to the present invention.

Video source data are encoded (S110).

Video source data may be encoded using AVC or HEVC.

For example, a video stream encoded using HEVC may include an Supplemental Enhancement Information (SEI) message having picture information of video data.

For a trick play of the HEVC-encoded video data stream, the SEI message of the HEVC video data may include Group of pictures (GOP) metadata. The HEVC video data may transmit VCL data (video coding layer (VCL) NAL unit) including a coding slice segment Network Abstraction Layer (NAL) unit or a sub unit thereof. In a case in which the SEI message includes GOP metadata, information regarding a picture before the VCL data may be signaled, whereby a trick play is efficiently executed.

The GOP metadata in the SEI message may include the total number of GOPs, the size of the GOP, the picture type of each picture constituting the GOP, a temporal ID, and the picture type of a temporal sub-layer.

A video having GOP metadata included in the SEI message is transmitted (S120).

The transmitted video data may be received and played using the following method.

The encoded video data are received (S210).

The SEI message of the received video is parsed to obtain Group of pictures (GOP) metadata (S220). In this case, the total number of GOPs, the size of the GOP, the picture type of each picture constituting the GOP, the temporal ID, and the picture type of the temporal sub-layer may be obtained from the Group of pictures (GOP) metadata of the SEI message of the video.

The encoded video source data are decoded using the Group of pictures (GOP) metadata obtained by parsing the SEI message (S230). In this case, pictures of the video source data may be filtered using the Group of pictures (GOP) metadata obtained by parsing the SEI message, and a trick play may be executed using the filtered pictures. In a case in which picture information of the Group of pictures (GOP) metadata included in the SEI message of the video and pointers (or video indexes) of the pictures of the encoded video data are used, a trick play may be efficiently executed. That is, the video decoder may decode pictures, filtered using the picture pointers of the video source, using metadata, obtained by the video parser upon parsing the SEI message. Consequently, it is possible to efficiently execute a trick play.

Figure 43:
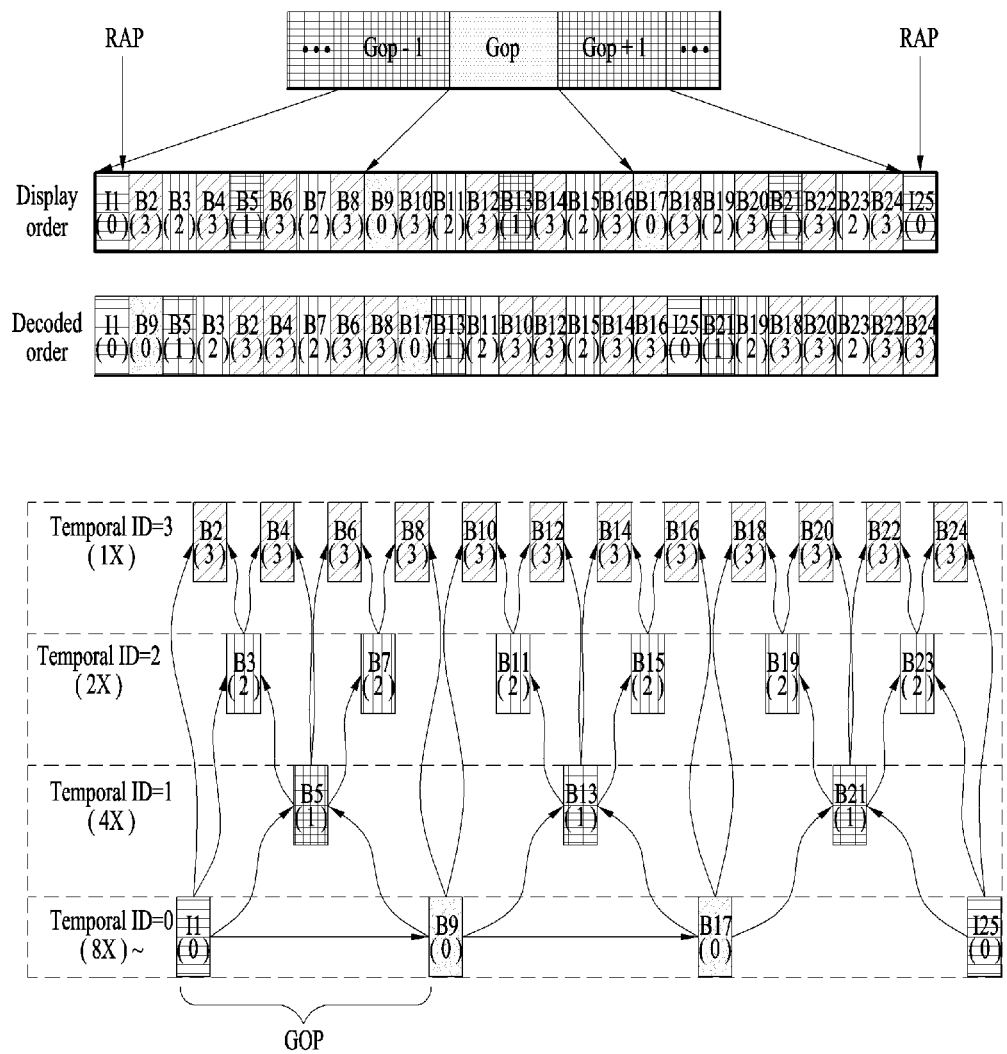
FIG. 43 is a view showing the structure of a Group of pictures (GOP) in a case in which video data are encoded in accordance with an embodiment of the present invention.

FIG. 43 is a view showing the structure of a Group of pictures (GOP) in a case in which video data are encoded in accordance with an embodiment of the present invention. An embodiment of the present invention will be described with reference to this figure.

In a case in which video source data are encoded and output, video data may be transmitted in units of GOP.

This example is an example of video data transmitted in units of GOP. GOP−1, GOP, and GOP+1, which are shown at the uppermost level of this figure, indicate that GOPS are transmitted in temporal order. In this figure, the maximum temporal_id of a NAL unit header is 2, and the size of the GOP is 24.

A GOP indicates a group of one or more types of pictures. A GOP may include several picture types, such as I, P, and B.

In this figure, the picture type and display order are indicated in the GOP. For example, pictures are display in the order of I1, B2, B3, B4, P5, B6, B7, P9, B10, B11, B12 . . . .

Due to reference relationship of video encoding, however, decoding is performed in the GOP in the order of I1, P5, B3, B2, B4, P9, B7, B6 . . . , which is different from the display order.

In a case in which a coded slice segment is included in an intra random access point (IRAP) picture, Temporal_Id has a value of 0. In this example, Temporal_Id of I1, P5, P9, P13, P17, and P21 has a value of 0.

B3, B7, B11, B15, B19, and B23 are pictures that use pictures having Temporal_Id of 0 in decoding order. Temporal_Id has a value of 1.

B2, B4, B6, B8, B10, B12, B14, B16, B18, B20, B22, and B24 are pictures that use pictures having Temporal_Id of 0 and 1 in decoding order. Temporal_Id has a value of 2.

In an embodiment of the present invention, each picture constituting the GOP may include a temporal ID, a picture type, temporal_sub_layer_picture_type, and a dependency_level. The total number of GOPs constituting a video stream and information of each picture of the GOP may be signaled first through an SEI message, which will be described hereinafter in detail.

Figure 44:
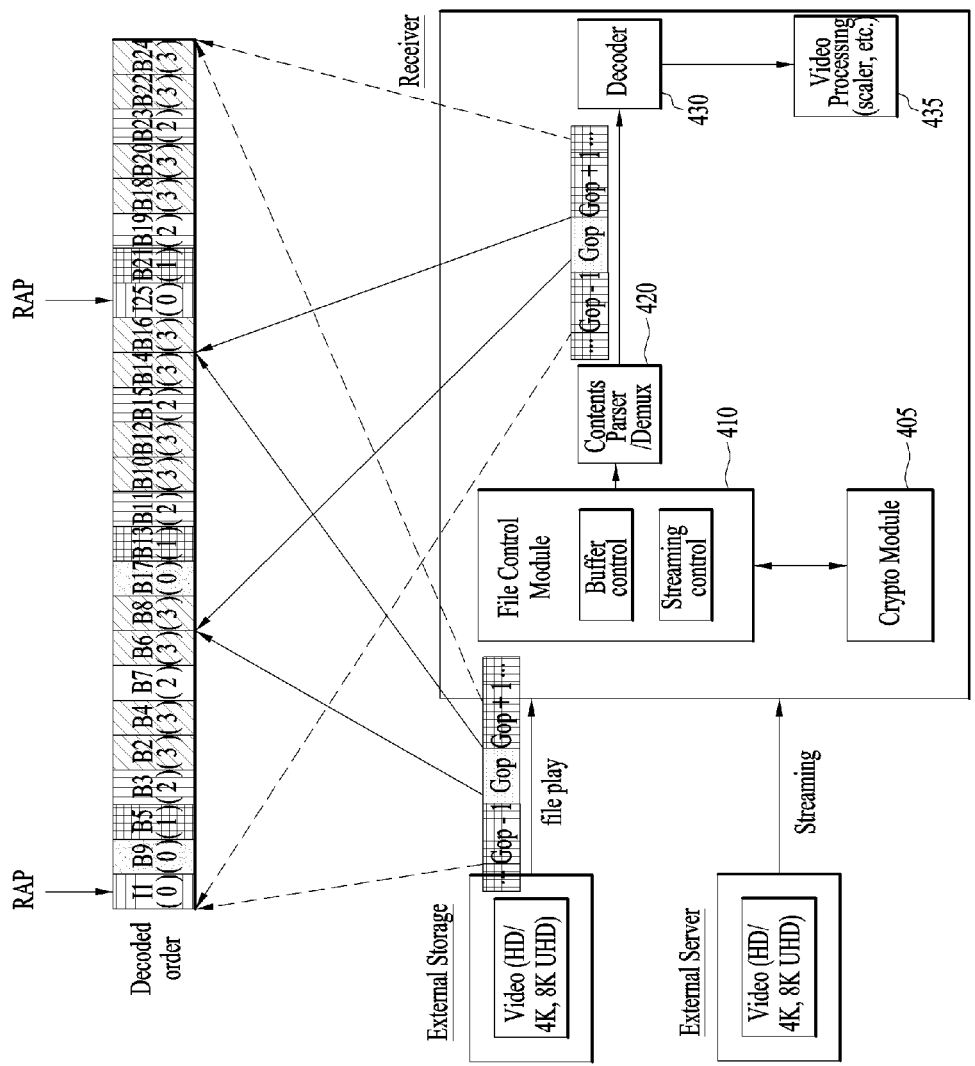
FIG. 44 is a view showing an example of syntax of video data transmitted and received in accordance with an embodiment of the present invention.

FIG. 44 is a view showing an example of syntax of video data transmitted and received in accordance with an embodiment of the present invention.

An SEI message of video data encoded in accordance with an embodiment of the present invention, particularly video data encoded using HEVC, may include metadata information of a GOP.

For example, in a case in which payloadType of the SEI message is specific payloadType (payloadType=xxx), the SEI message may include GOP metadata information (trickplay_service_GOP_metadata_info (payloadSize)) for a trick play service. This information may be included in an SEI raw byte sequence payload (RBSP) of the SEI message.

In a case in which, when an HEVC NAL unit of the video data is parsed, a value of nal_unit_type is a value corresponding to the SEI data and payloadType is a specific value, the video parser in the decoder of the receiver may obtain GOP metadata information (trickplay_service_GOP_metadata_info) for a trick play service. At this time, payloadType may have an integer value greater than 0.

A video parser of a decoder of a receiver may decode GOP metadata information (tricklplay_service_GOP_metadata_info( )) for a trick player service to acquire metadata information of GOP for trick player of video data. FIG. 42 is a diagram illustrating a method of transmitting and receiving a signal according to another embodiment of the present invention.

Video data may be encoded (S110).

AVC or HEVC may be used via a method of encoding the video data.

A file format containing the encoded video data may be encoded (S120).

For example, the encoded file format may comply with format such as Base Media File Format or Common File Format. The encoded file format may include pre-filtering format having picture information required for trick play, which will be illustrated in FIGS. 46 to 48.

For example, the pre-filtering information may include transmission unit type information (NAL_unit_type) and temporal ID information (Temporal ID) of a picture (or sample) included in the video data. Accordingly, when a file format is transmitted, information for filtering a picture required for trick play may be transmitted in a system level. When a receiver filters pictures included in the video data using the information and decodes only pictures included in the trick play, high-speed transmission of pictures according to trick play is not required and, thus, system performance may be enhanced.

Data containing the encoded file format may be transmitted (S130).

In order to transmit data, the data may be stored in a server or transmitted in streaming. When data is transmitted in the form of PES, a PES packet may include information of a PES level in order to effectively embody trick play, as illustrated in FIGS. 1 to 41.

When the transmitted video data is received and reproduced, the following method may be used.

File format data containing the encoded video data may be received (S210). The received data may be temporally stored in the receiver. When data is received in the form of PES, the PES packet may include information of a PES level in order to effectively embody trick play, as illustrated in FIGS. 1 to 41.

The received data may be parsed (S220).

The file format data included in the received data may comply with format such as Base Media File Format or Common File Format. When the received data is parsed, pre-filtering information on the encoded video data may be acquired from box information of movie box ('moov') or movie fragment box ('moon, for example, Base Media File Format or Common File Format. The pre-filtering information may include transmission unit type information (NAL_unit_type) and temporal ID information (Temporal ID) of a picture (sample).

Accordingly, pre-filtering information may be acquired from the file format data and pictures of the encoded video data may be filtered. In addition, in the case of high X speed of the encoded video data, pictures of the encoded video data may be filtered using pre-filtering information in a system level and transmitted to the video decoder.

The video data filtered using the pre-filtering information may be decoded and trick play may be performed on the filtered video data (S230).

Accordingly, trick play may be effectively performed during video decoding using pre-filtering information in a system level.

FIG. 43 is a diagram illustrating an example of configurations of a random access point and a group of picture (GOP) for description of an embodiment of the present invention.

When video source data is encoded and output, video data may be transmitted in a GOP unit.

The example is an example of the video data transmitted in a GOP unit. The uppermost GOP−1, GOP, and GOP+1 in the drawing may correspond to an example in which GOPs are transmitted according to a time sequence and FIG. 43 corresponds to the case in which Temporal_id corresponds to four cases of 0, 1, 2, and 3. In addition, a number in a bracket may refer to Temporal ID corresponding to each picture. A RAP or GOP configuration may be changed according to an encoding method of video data.

The GOP may refer to a set of one or more types of pictures and include a plurality of pictures types of I, P, and B.

In this drawing, GOP−1, GOP, and GOP+1 may or may not include RAP. In this example, a picture type and picture display order in GOPs are illustrated together and an order of the displayed pictures is illustrated as an order of I1, B2, B3, B4, B5, B6, B7, B8, B9, B10, B11, B12, B13, B14, B15, B16, B17, B18, B19, B20, B21, B22, B23, B24, and I25.

However, according to a reference relationship of video encoding, a decoded order in the GOPs may correspond to an order of I1, B9, P5, B3, B2, B4, B7, B6, B8, B17, B13, B11, B10, B12, B15, B16, B14, B16, I25, B21, B19, B18, B20, B23, B22, and B24 and the decoded order may be different from the display order. In this drawing, a number in a bracket 0 may refer to a corresponding temporal ID.

When a coded slide segment is included in an intra random access point (TRAP) picture, Temporal_Id may have a value of 0. In this example, in the case of I1, B9, B17, and I25, Temporal_Id may have a value of 0.

In this example, B5, B13, and B21 are each a picture with Temporal_Id of 1, B3, B7, B11, B15, B19, and B23 are each a picture with Temporal_Id of 2, and B2, B4, B6, B8, B10, B12, B14, B16, B18, B20, B22, and B24 are each a picture with Temporal_Id of 2.

Here, it is assumed that GOP−1 may include a picture of I1, B2, B3, B4, B5, B6, B7, and B8, GOP may include a picture of B9, B10, B11, B12, B13, B14, B15, and B16, and GOP+1 may include a picture of B17, B18, B19, B20, B21, B22, B23, and B24. In this example, I1 and I25 are RAP and are each a picture with Temporal_Id of 0. A RAP and GOP configuration may be changed according to an encoding method.

According to an exemplary embodiment of the present invention, X8 speed trick play may use a picture with Temporal_Id of 0. In this case, trick play may be performed using one picture with Temporal_Id of 0 every GOP. X4 speed trick play may use pictures with Temporal_Id of 0 and 1. X2 speed trick play may use a picture with Temporal_Id of 0, 1, and 2, and X1 speed trick play may use a picture with Temporal_Id of 0, 1, 2, and 3. According to an embodiment of the present invention, information on a picture required for trick play is used in a system prior to decoding of the picture to decode only pictures required for trick play, thereby enhancing system performance of trick play.

FIG. 44 is a diagram illustrating a method of decoding pictures in a GOP in a decoded order, as an example of a receiver.

The receiver may include a file control module 410, a content parser 420, and a video decoder 430. In addition, the receiver may further include a crypto module 405 and a video processing unit 435.

An external storage or an external server may provide video data containing the aforementioned GOP configuration to the receiver. The receiver may read file format video data (HD or 4K, 8K UHD video data) from an external storage or receive streaming format video data from the external server. The video data may include the aforementioned GOP configuration.

The file control module 410 may temporally store the video data or streaming data read or received from the external storage or the external server. In this case, the file control module 410 may control the received streaming and control temporal storage of video data using a buffer.

The crypto module 405 may decode encrypted data when files or streaming data stored in the file control module 410 are encrypted.

The content parser 420 may parse and demultiplex the video data that is temporally-stored by the file control module 410 and transmit the parsed or demultiplexed video data to the video decoder 430.

When an X speed function of trick play is used in the case of high image quality video data such as UHD content, stream needs to be transmitted at speed of two, four, and eight times higher than a normal X peed and, thus, transmission speed of video data cannot exceed a maximum transmission bit rate for transmission up to a video decoder. Accordingly, in this case, it is difficult to normally perform trick play of video data and, thus, there is a risk that video decoding play performance of the receiver is degraded.

The video processing unit 435 may perform post processing such as scaling on the video data decoded by the video decoder 430 so as to obtain smoother image quality of content.

The received video data may be received in a PES format containing file format. In this case, as illustrated in FIGS. 1 to 41, trick play may be performed using information of a PES level.

Figure 45:
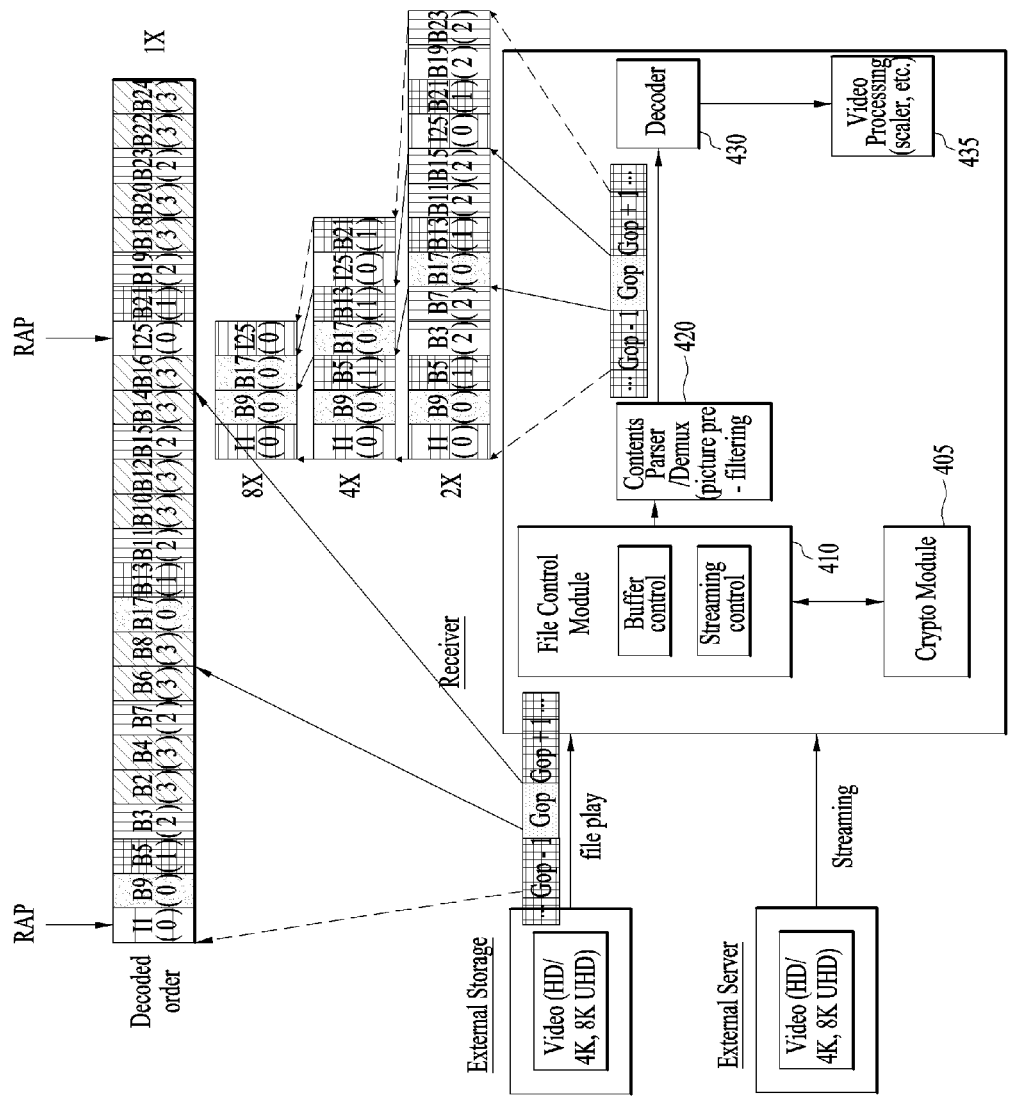
FIG. 45 is a diagram illustrating trick play using GOP metadata according to an embodiment of the present invention.

FIG. 45 is a diagram illustrating trick play using GOP metadata according to an embodiment of the present invention. When trick play is performed in the same environment as video data having the same GOP configuration as in the aforementioned drawing, a high X speed function may be embodied using information in a system level as following according to an embodiment of the present invention.

According to an embodiment of the present invention, a receiver may include the file control module 410, the content parser 420, and the video decoder 430. In addition, according to an embodiment of the present invention, the receiver may further include the crypto module 405 and the video processing unit 435.

As described above, the content parser 420 according to the present embodiment may parse or demultiplex video data that is temporally stored in the file control module 410 or transmit the parsed or demultiplexed video data to the video decoder 430. In this case, the content parser 420 may demultiplex the received data to pre-acquire parsing information or signaling information of content. In this case, the content parser 420 may acquire pre-filtering information for pre-filtering a picture for trick play and transmit only pictures required for a high X speed function to the video decoder 430.

The pre-filtering information may include information on start or end point of GOP, a GOP picture type, or information on whether reference is made. The content parser 420 may preferentially filter only a picture of GOP required to reproduce at a high X speed using metadata of pictures including the pre-filtering information and then transmit the filtered pictures to the video decoder 430.

Accordingly, when the video decoder 430 performs a high X speed function, only a pre-filtered picture may be decoded and, thus, even if there is a limit in a maximum transmission bit rate, trick play may be performed so as not to adversely affect system performance.

Hereinafter, a detailed example of the above exemplified pre-filtering information will be described.

FIG. 46 is a diagram illustrating an example of the above exemplified pre-filtering information. The example of the pre-filtering information illustrated in FIG. 46 may correspond to an example of a function required for a high X speed function when video data using an encoding method such as HEVC includes a plurality of pictures in GOP.

First, sample count information (sample_count) may correspond to a number corresponding to a picture included in video data.

Transmission unit type information (NAL_unit_type) may correspond to, for example, NAL_unit_type defined in AVC or HEVC codec.

Information on whether reference is made (Ref/Non-Ref picture) may indicate information indicating whether another picture is referred when a picture is decoded.

In addition, Temporal ID may have the same value as temporalID (i.e., temporalId=nuh_temporal_id_plus1 ? 1) calculated using nuh_temporal_id_plus1 in HEVC.

According to an embodiment of the present invention, this information to be included in coded video data may be transmitted in a system level but not in a video data level and trick play may be performed. Detailed information that can include examples of the pre-filtering information illustrated in the drawing will be described below.

FIG. 47 is a diagram illustrating an example of a file transmission box including examples of the above exemplified pre-filtering information. For example, the exemplified box may be transmitted according to a format defined according to Base Media File Format, Common File Format, or the like.

For example, the examples of the pre-filtering information may be transmitted in movie box ('moov') or movie fragment box ('moof') in the case of Common File Format (CFF). In the present embodiment, a name of the disclosed new box is exemplary and, thus may be changed.

For example, the movie box ('moov') may include sub boxes for defining metadata for presentation.

A configuration of box information ('gsin' box) of the exemplified file format will be described below.

The corresponding box information may include the above disclosed sample count information and include transmission unit type information (NAL_unit_type) and temporal ID information (Temporal ID) according to each sample count.

A detailed pre-filtering process will be described below.

When video data is transmitted in a format of movie box or movie fragment box of BMFF or CFF, the movie box or the movie fragment box may include the exemplified box information ('gsin' box).

Upon reading video data transmitted in a file format, the receiver may extract and store transmission unit type information (NAL_unit_type) and temporal ID information (Temporal ID) of a picture (or sample) included in the video data from the exemplified file format. This information may be extracted and stored from a file format by a file control module in a system level.

In addition, when a high X speed function needs to be performed, a content parser may filter video data using the above pre-filtering information in a system level before a video decoder decodes the video data. Upon filtering the video data, the content parser may pre-filter pictures that are not required for X speed reproduction or pictures that are not required for reference using transmission unit type information (NAL_unit_type) and temporal ID information (Temporal ID) of each picture included in the video data and transmit the pictures to the video decoder.

Accordingly, the pictures that are not required for high X speed may be pre-filtered in a system level and the video decoder may receive and decode only pictures after filtering so as to reduce the number of times of transmission and processing of the video data in a system level prior to the video decoder, thereby preventing overall performance of the receiver from being degraded.

FIG. 48 is a diagram illustrating another example of a file transmission box including examples of the above exemplified pre-filtering information. For example, box information ('trik' box) illustrated in the drawing may be transmitted in movie box ('moov') or movie fragment box (moor) of Base Media File Format or Common File Format.

Here, sample count information (sample_count) may refer to a number of a picture included in the video data.

When high X speed is not required or filtering is not required (flags=0 needs to be checked), a content parser may acquire picture type information (pic_type) and dependency level information (dependency_level) from file format in a system level.

The picture type information (pic_type) may be configured by selecting some nal_unit_type that can be used in trick play from NAL_unit_type of HEVC.

For example, according to a value of picture type information (pic_type), picture type information (pic_type) may indicate an IDR picture (IDR_N_LP of HEVC) that does not have a related leading picture, an IDR picture having a related decodable leading picture (IDR_N_LP of HEVC), a BLA picture (IDR_W_RADL of HEVC) having a related leading picture, and so on. Alternatively, according to a value of picture type information (pic_type), picture type information (pic_type) may indicate a BLA picture (BLA_W_RADL of HEVC) that has a related RADL picture but does not have a related RASL picture, a BLA picture (BLA_W_LP of HEVC) having a related RADL picture and an RASL picture, a CRA picture (CRA_NUT of HEVC) having a related leading picture, a random access decodable leading picture (RADL) picture (RADL_R of HEVC), and a random access skipped leading picture (RASL) picture (RASL_N of HEVC or RASL_R), and pic_type may indicate a non-determined I picture (IDR_N_LP of HEVC), an unknown value, or the like.

Dependency level information (dependency_level) may indicate information indicating a size of dependently of each picture in GOP and a value thereof will be described below. For example, dependency level information (dependency_level) may indicate that dependency_level of a video sample is not known or the video sample does not depend on samples with a greater dependency_level values than this one.

When high X speed is performed or filtering is not required (flags≠0 needs to be checked), a content parser may acquire temporal service layer picture type information (temporal_sub_layer_pic_type), maximum temporal ID information (max_temporal_ID), temporal ID information (temporal_ID), and so on from a file format in a system level.

Temporal service layer picture type information (temporal_sub_layer_pic_type) may be information for identification of a sub layer picture type that can be adaptively changed among pictures having Temporal ID.

Maximum temporal ID information (max_temporal_ID) may indicate a maximum temporal_id value included in a video stream.

Temporal ID information (temporal_ID) may be information calculated using nuh_temporal_id_plus1 in HEVC as described above.

According to whether temporal service layer picture type information (temporal_sub_layer_pic_type) indicates TSA or STAS, text temporal ID information (next_temporal_id) may be acquired.

When temporal service layer picture type information (temporal_sub_layer_pic_type) indicates TSA, next temporal ID information (next_temporal_id) may indicate a moveable temporal ID information (temporal_ID) in order to indicate a maximum changeable frame rate according to temporal service layer picture type information (temporal_sub_layer_pic_type).

For example, in a stream with maximum temporal ID information (max_temporal_ID) of 2, in order to provide X4 speed trick play for displaying only a picture with temporal ID information of 0 and then return the speed to a normal X speed (X1 speed), when temporal service layer picture type information (temporal_sub_layer_pic_type) is TSA, the next temporal ID information (next_temporal_id) may have a value of maximum temporal ID information (max_temporal_ID).

On the other hand, when temporal service layer picture type information (temporal_sub_layer_pic_type) is STSA, next temporal ID information (next_temporal_id) may have a value obtained by adding 1 to temporal ID information (temporal_ID).

In addition, when temporal service layer picture type information (temporal_sub_layer_pic_type) is not TSA or STAS, the exemplified ('trik' box) may have dependency level information (dependency_level).

When a file format for transmitting video data, for example, a movie box or movie fragment box of BMFF or CFF includes the exemplified box information trick play box), a file control module may extract and store transmission unit type information (NAL_unit_type) and temporal ID information (Temporal ID) of each picture or sample from the box information.

In addition, when a receiver performs a high X speed function, a content parser may filter using the above pre-filtering information in a system level before the video data decodes the video data.

When video data is reproduced with trick play, the content parser of the receiver may pre-filter pictures that are not required for desired X speed reproduction or non-reference pictures using temporal ID information (temporal_ID) and transmission unit type information (NAL_unit_type) of each picture in a system level. The content parser may apply picture type information (pic_type) and temporal ID information (temporal ID) to each picture or sample included in video using the exemplified box information to filter each picture in a system level prior to a video decoder.

The video decoder may receive only picture required for trick play from the content parser and decode only picture trick play using the same.

Pictures required for high speed reproduction may be pre-filtered in a system level so as to prevent overall performance of the receiver from being degraded due to transmission and processing of video data with high speed prior to a video decoder.

Accordingly, according to an embodiment of the present invention, all pictures included in video data in a system level in the case of trick play may be transmitted at high system so as to degrade system performance.

Figure 49:
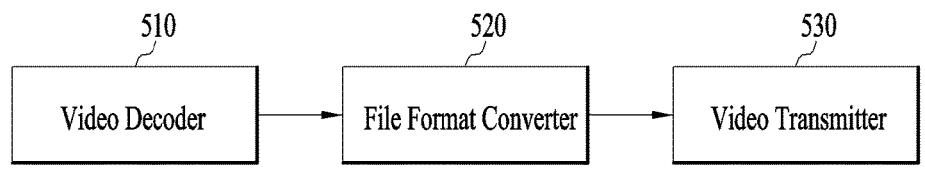
FIG. 49 is a diagram illustrating a signal transmitting apparatus according to an embodiment of the present invention.

FIG. 49 is a diagram illustrating a signal transmitting apparatus according to an embodiment of the present invention. Referring to the drawing, an operation of a signal transmitting apparatus according to an embodiment of the present invention will be described.

According to an embodiment of the present invention, the signal transmitting apparatus may include video encoder 510, a file format converter 520, and a video transmitter 530.

The video encoder 510 may encode video data. The video encoder 510 may use AVC or HEVC via a method of encoding video source data.

The file format converter 520 may encode a file format including the encoded video data. The encoded file format may comply with format such as Base Media File Format or Common File Format. The encoded file format may include pre-filtering information having picture information required for trick play, which will be described with reference to FIGS. 46 to 48.

For example, the pre-filtering information may include transmission unit type information (NAL_unit_type) and temporal ID information (Temporal ID) of a picture (or sample) included in the video data. Accordingly, when a file format is transmitted, information for filtering a picture required for trick play may be transmitted in a system level. When the receiver filters pictures included in video data using the information and decodes only pictures included in the trick play, it is not required to transmit pictures at high speed due to trick play and, thus, system performance may be enhanced.

A file format containing the encoded video data may be stored in a server or transmitted in streaming (S130).

When video data is transmitted, the video data may include information of a PES level in order to effectively embody trick play as illustrated in FIGS. 1 to 41.

According to an embodiment of the present invention, signaling information for trick play of a stream using a standard encoding method, for example, an AVC or HEVC stream may be transmitted and received in a system level. According to an embodiment of the present invention, when the encoded stream is signaled with trick play, an openended method may be provided. In addition, more effective trick play can be performed while being compatible with a trick play method of HEVC-encoded content.

According to the disclosed embodiments, when trick play is performed on an HEVC stream, information on each picture in a system level can be known and, thus, an unnecessary frame may not be transmitted to a video decoder during X speed reproduction, thereby prevent internal time delay and bottleneck.

MODE FOR INVENTION

Various embodiments for carrying out the invention have been described in the best mode for carrying out the invention.

INDUSTRIAL APPLICABILITY

The present invention may be used extensively in the broadcasting and video signal processing industries.

The invention claimed is:

1. A method of receiving a broadcast signal by a broadcast reception apparatus, the method comprising:
    receiving, by a receiver in the broadcast reception apparatus, file format data based on Base Media File Format comprising encoded video data,
    wherein the file format data includes box information comprising pre-filtering information, and
    wherein the pre-filtering information comprises information on a start point or an end point of a Group of Pictures (GOP), a GOP picture type of each picture constituting the GOP, or information on whether another picture is required to be referred;
    parsing, by a content parser in the broadcast reception apparatus, the received file format data to acquire the pre-filtering information from the box information of the file format data and filtering pictures required for an X speed function of the encoded video data; and
    decoding, by a video decoder in the broadcast reception apparatus, the filtered pictures and performing trick play on the encoded video data,
    wherein the pre-filtering information further comprises temporal identification (ID) information and dependency level information indicating a dependency level of the each picture constituting the GOP,
    wherein the temporal ID information is used for the X speed function of the encoded video data on which the trick play is performed, and
    wherein the dependency level information is used for providing a higher speed than a maximum X speed by using the temporal ID information.

2. The method according to claim 1, wherein the temporal ID information is associated with a picture or sample of the encoded video data.

3. The method according to claim 1, wherein the receiving of the file format data based on Base Media File Format comprising the encoded video data comprises acquiring personal video recording (PVR) assist information having a maximum temporal ID information value of a video stream comprising the encoded video data.

4. An apparatus for transmitting a signal, the apparatus comprising:
    a video encoder configured to encode video data;
    a file format converter configured to encode file format data based on Base Media File Format comprising the encoded video data,
    wherein the file format data includes box information comprising pre-filtering information for performing trick play on the encoded video data, and
    wherein the pre-filtering information comprises information on a start point or an end point of a Group of Pictures (GOP), a GOP picture type of each picture constituting the GOP, or information on whether another picture is required to be referred; and
    a transmitter configure to transmit data comprising the encoded file format data,
    wherein the pre-filtering information further comprises temporal identification (ID) information and dependency level information indicating a dependency level of the each picture constituting the GOP,
    wherein the temporal ID information is used for an X speed function of the encoded video data on which the trick play is performed, and
    wherein the dependency level information is used for providing a higher speed than a maximum X speed by using the temporal ID information.

5. An apparatus for receiving a signal, the apparatus comprising:
    a receiver configured to receive file format data based on Base Media File Format, comprising encoded video data,
    wherein the file format data includes box information comprising pre-filtering information, and
    wherein the pre-filtering information comprises information on a start point or an end point of a Group of Pictures (GOP), a GOP picture type of each picture constituting the GOP, or information on whether another picture is required to be referred;
    a content parser configured to parse the received file format data to acquire the pre-filtering information from the file format data and to filter pictures required for an X speed function of the encoded video data; and
    a video decoder configured to decode the filtered pictures,
    wherein the pre-filtering information further comprises temporal identification (ID) information and dependency level information indicating a dependency level of the each picture constituting the GOP,
    wherein the temporal ID information is used for the X speed function of the encoded video data on which trick play is performed, and wherein the dependency level information is used for providing a higher speed than a maximum X speed by using the temporal ID information.

* * * * *